(12) United States Patent
Kim

(10) Patent No.: US 12,092,617 B2
(45) Date of Patent: Sep. 17, 2024

(54) DISPLAY MODULE EVALUATION JIG AND DISPLAY MODULE EVALUATION METHOD

(71) Applicant: Samsung Display Co., Ltd., Yongin-Si (KR)

(72) Inventor: Gabtae Kim, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 478 days.

(21) Appl. No.: 17/532,281

(22) Filed: Nov. 22, 2021

(65) Prior Publication Data
US 2022/0307955 A1 Sep. 29, 2022

(30) Foreign Application Priority Data
Mar. 26, 2021 (KR) .................. 10-2021-0039565

(51) Int. Cl.
| | |
|---|---|
| *G01N 3/303* | (2006.01) |
| *G01M 7/08* | (2006.01) |
| *G01N 3/02* | (2006.01) |
| *G01N 3/30* | (2006.01) |

(52) U.S. Cl.
CPC ............. *G01N 3/303* (2013.01); *G01N 3/02* (2013.01)

(58) Field of Classification Search
CPC ............ G01N 3/04; G01N 3/30; G01N 3/303; G01N 2203/006; G01N 2203/0282; G01N 2203/04; G01N 3/08; G01M 7/08; G09F 9/301; G06F 1/1652; G06F 1/1641; G06F 1/16; G06F 1/1656; G03F 7/0007; H10K 71/00; G06K 9/0004
See application file for complete search history.

(56) References Cited

U.S. PATENT DOCUMENTS

| | | | | |
|---|---|---|---|---|
| 2005/0226455 | A1* | 10/2005 | Aubauer | G06F 3/0436 381/388 |
| 2017/0307808 | A1* | 10/2017 | Lee | G02B 6/005 |
| 2020/0364436 | A1* | 11/2020 | Beon | H10K 50/844 |
| 2021/0036069 | A1* | 2/2021 | Ha | G06F 1/16 |

FOREIGN PATENT DOCUMENTS

| | | |
|---|---|---|
| JP | 4311481 B2 | 8/2009 |
| KR | 100921401 B1 | 10/2009 |
| KR | 101645958 B1 | 8/2016 |
| KR | 1020200068706 A | 6/2020 |

\* cited by examiner

*Primary Examiner* — Brandi N Hopkins
(74) *Attorney, Agent, or Firm* — CANTOR COLBURN LLP

(57) ABSTRACT

Disclosed are display module evaluation jigs and methods, The display module evaluation jig includes: a first body defining a plurality of first recessions on a top surface of the first body; a second body disposed on and combined with the first body; and a plurality of insertions on the first recessions and between the first body and the second body. Inner lateral surfaces of the first body are directed toward and spaced apart from lateral surfaces of the insertions. The inner lateral surfaces define the first recessions.

20 Claims, 17 Drawing Sheets

DISPLAY MODULE EVALUATION JIG AND DISPLAY MODULE EVALUATION METHOD

This application claims priority to Korean Patent Application No. 10-2021-0039565 filed on Mar. 26, 2021, and all the benefits accruing therefrom under 35 U.S.C. § 119, the content of which in its entirety is herein incorporated by reference.

BACKGROUND

The present invention relates to a display module evaluation jig and a display module evaluation method.

When users use a display device set, user's carelessness may cause a pen to drop onto a display module of the display device set.

The impacted display module may have bright spot or crack.

The display module may undergo durability evaluation to endure impact possibly occurring in actual life. In a general way, a display module is disposed on a stone surface plate, and a drop height from the pen to the display module is altered to measure a height of the pen that causes the display module to fracture.

However, there is no agreement between the above method in which the pen drops to the display module disposed on the stone surface plate and an actual environment in which the pen drops to the display module during user's practical use of the display module set.

Accordingly, it is desirable that the display module undergo the durability evaluation under environmental condition similar to that under which users use the display module set even in a case where the display module set is currently developed or is difficult to obtain.

SUMMARY

The present invention provides a display module evaluation jig and a display module evaluation method that provide display modules with evaluation environments similar to various actual environments under which the display modules are practically used by users.

According to an embodiment of the present invention, a display module evaluation jig includes: a first body defining a plurality of first recessions on a top surface of the first body; a second body disposed on and combined with the first body; and a plurality of insertions on the first recessions and between the first body and the second body. Inner lateral surfaces of the first body are directed toward and spaced apart from lateral surfaces of the insertions. The inner lateral surfaces define the first recessions.

In an embodiment, the insertions may be spaced apart from a bottom surface of the second body. The bottom surface of the second body may face the top surface of the first body.

In an embodiment, the first recessions may have a depth greater than a thickness of the insertions. The depth and the thickness may be measured in a direction perpendicular to the top surface of the first body.

In an embodiment, the first body may define a plurality of bending grooves that are recessed inwardly from lateral surfaces of the first body.

In an embodiment, a display module may be on the second body. The display module may be folded about a folding axis that extends in one direction. The folding axis may overlap a portion of the bending grooves in a plan view.

In an embodiment, the second body may define a connecting groove that is recessed inwardly from one lateral surface of the second body.

In an embodiment, a connector in the connecting groove may be connected to the display module.

In an embodiment, the display module may be on a second recession that is defined on a first part of a top surface of the second body. A flexible circuit board connected to the display module is on a third recession that is defined on a second part of the top surface of the second body. The third recession may be lower than the second recession.

In an embodiment, the first recessions may not overlap the third recession in the plan view.

In an embodiment, the display module evaluation jig may further include: a pen which is disposed on the display module; and a pen dropper which is disposed on the display module and in which a pen is disposed. The pen dropper may adjust a height of the pen and control the pen to drop.

In an embodiment, the pen dropper may include: a lower tube defining a first pen hole on a central portion of the lower tube; an upper tube on the lower tube and defining a plurality of stopper holes that are spaced apart from each other at a regular interval on one lateral surface of the upper tube, where the upper tube defines a second pen hole connected to the first pen hole; and a stopper in one of the stopper holes of the upper tube.

According to an embodiment of the present invention, a display module evaluation method includes: placing on a base plate a display module evaluation jig that includes a first body, a second body on the first body, and a plurality of insertions between the first body and the second body; placing a display module on the second body; placing on the display module a pen dropper in which a pen is disposed; and controlling the pen dropper to drop the pen from the pen dropper to the display module to provide the display module with impact.

In an embodiment, the step of controlling the pen dropper may include controlling the pen to drop onto the display module by using the pen dropper to change a height of the pen.

In an embodiment, the display module evaluation method may further include: determining durability of the display module by identifying the height of the pen. The height of the pen may induce damage to the display module in accordance with the impact.

In an embodiment, a plurality of first recessions may be defined on a top surface of the first body. The first recessions may receive the insertions.

In an embodiment, inner lateral surfaces of the first body may be directed toward and spaced apart from lateral surfaces of the insertions. The inner lateral surfaces may define the first recessions.

In an embodiment, the display module may be on a second recession defined on a first part of a top surface of the second body. A flexible circuit board connected to the display module may be on a third recession that is defined on a second part of the top surface of the second body. The third recession may be lower than the second recession.

In an embodiment, the step of placing the pen dropper may include disposing the pen dropper on the display module that overlaps the second recession in the plan view.

In an embodiment, the pen dropper may include a lower tube, an upper tube on the lower tube, and a stopper. A first pen hole may be defined in a central portion of the lower tube. A second pen hole may be defined in a central portion of the upper tube. The second pen hole may be connected to the first pen hole. A plurality of stopper holes may be defined on one lateral surface of the upper tube. The stopper holes may be spaced apart from each other at a regular interval and located at various heights. The stopper may be disposed in one of stopper holes.

In an embodiment, the step of controlling the pen to drop may include selectively disposing the stopper in the stopper holes to adjust the height of the pen and to control the pen to drop.

DETAILED DESCRIPTION

Figure 1A:
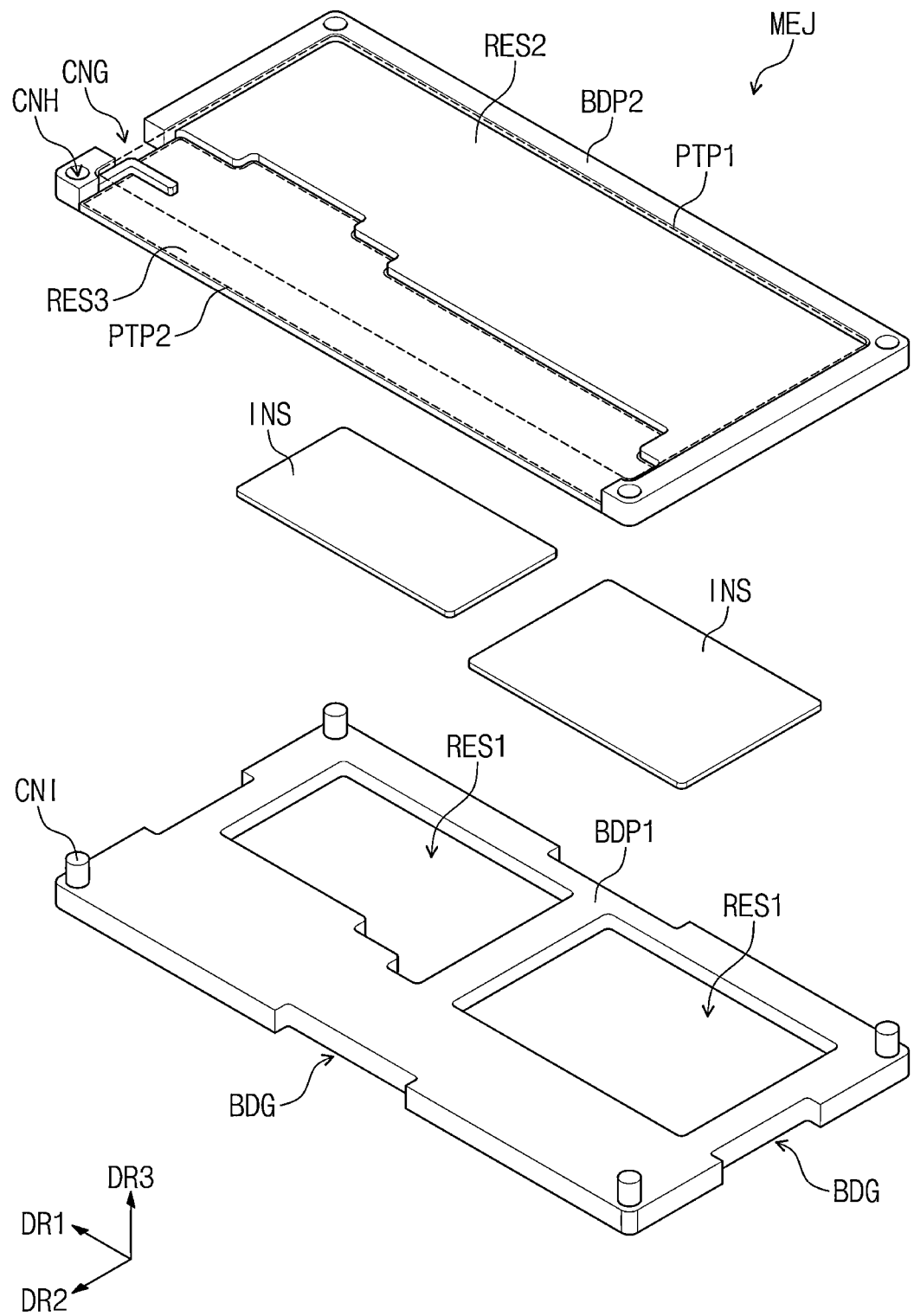
FIG. 1A illustrates an exploded perspective view showing a display module evaluation jig according to an embodiment of the present invention.

In this description, when a certain component (or region, layer, portion, etc.) is referred to as being "on", "connected to", or "coupled to" other component(s), the certain component may be directly disposed on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the present invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

Unless otherwise defined, all terms used herein including technical and scientific terms have the same meaning generally understood by one of ordinary skill in the art. Also, terms as defined in dictionaries generally used should be understood as having meaning identical or meaning contextually defined in the art and should not be understood as ideally or excessively formal meaning unless definitely defined herein.

The following will now describe some embodiments of the present invention in conjunction with the accompanying drawings.

Figure 1B:
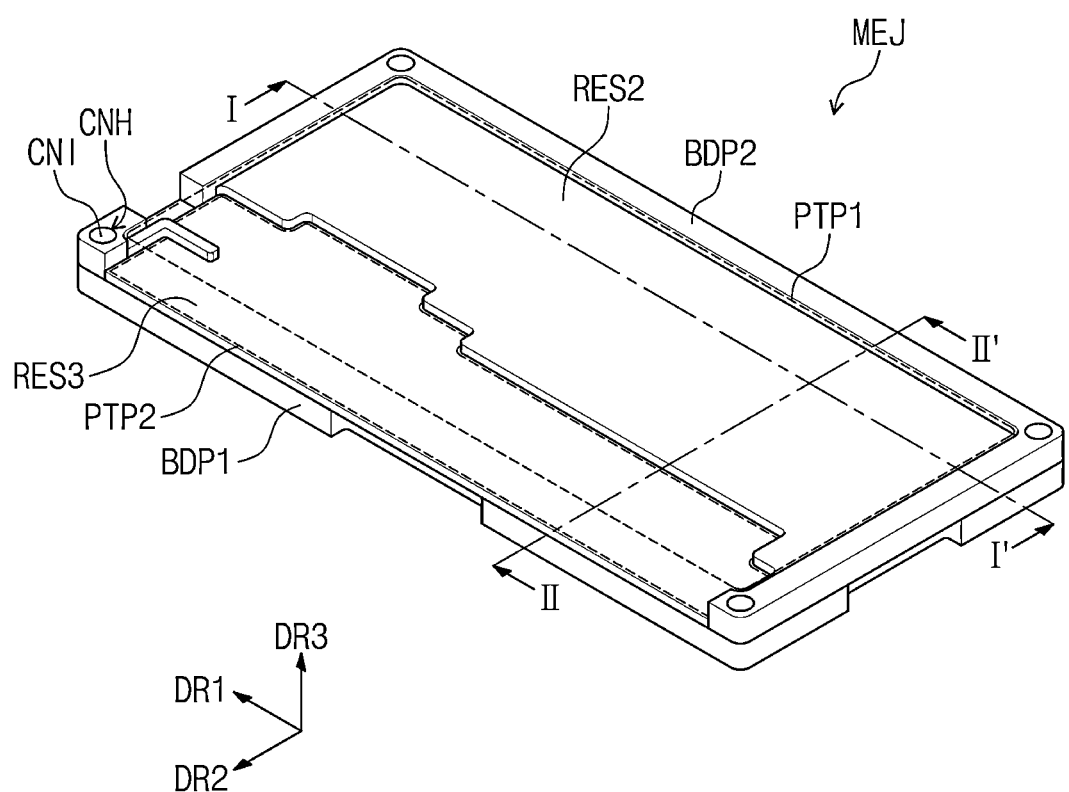
FIG. 1B illustrates a perspective view showing a display module evaluation jig according to an embodiment of the present invention.

FIG. 1A illustrates an exploded perspective view showing a display module evaluation jig according to an embodiment of the present invention. FIG. 1B illustrates a perspective view showing a display module evaluation jig according to an embodiment of the present invention.

Referring to FIGS. 1A and 1B, a display module evaluation jig MEJ may include a first body BDP1, a second body BDP2 disposed on the first body BDP1, and a plurality of insertions INS disposed between the first body BDP1 and the second body BDP2.

The first body BDP1 may have a substantially tetragonal shape with long sides extending in a first direction DR1 and short sides extending in a second direction DR2. However, no limitation is imposed on the shape of the first body BDP1 according to the invention.

Hereinafter, a third direction DR3 is defined to refer to a direction that substantially vertically intersects a plane defined by the first and second directions DR1 and DR2. In this description, the phrase "when viewed in plan" or "in a plan view" may mean "when viewed in the third direction DR3."

A plurality of first recessions RES1 may be defined on a top surface of the first body BDP1. The first recessions RES1 may have their substantial, tetragonal shapes when viewed in plan, but no limitation is imposed on the shape of the first recessions RES1 according to the invention.

The first body BDP1 may have a plurality of connection parts CM which protrude in the third direction DR3 and which are defined on locations around vertices of the top surface of the first body BDP1. The connection parts CM may fixedly attach the first body BDP1 to the second body BDP2.

When viewed in plan, the first body BDP1 may define on its lateral surfaces a plurality of bending grooves BDG that are recessed inwardly from the lateral surfaces of the first body BDP1.

The first body BDP1 may include one or more of aluminum (Al), stainless steel ("SUS"), and polycarbonate ("PC"). The first body BDP1, however, may include various materials without being limited thereto.

The second body BDP2 may have a rectangular shape with long sides extended in the first direction DR1 and short sides extended in the second direction DR2. However, no limitation is imposed on the shape of the second body BDP2 according to the invention.

When viewed in plan, the second body BDP2 may define on its one lateral surface a connecting groove CNG that is recessed inwardly from the one lateral surface of the second body BDP2.

The second body BDP2 may define a plurality of connection holes CNH which penetrate therethrough in the third direction DR3 and which are defined on locations around vertices of a top surface of the second body BDP2. The connection parts CM may be inserted into the connection holes CNH to allow the first body BDP1 to combine with the second body BDP2. For example, the insertion of the connection parts CM into the connection holes CNH may couple the first and second bodies BDP1 and BDP2 to each other.

When viewed in plan, a first part PTP1 and a second part PTP2 may be defined on the top surface of the second body BDP2. The first and second parts PTP1 and PTP2 may be defined continuously with each other.

On the first part PTP1, the top surface of the second body BDP2 may be recessed to define a second recession RES2. For example, the first part PTP1 may be formed lower than a circumference of the first part PTP1.

On the second part PTP2, the top surface of the second body BDP2 may be recessed to define a third recession RES3. For example, the second part PTP2 may be formed lower than a circumference of the second part PTP2.

The third recession RES3 recessed from the top surface of the second body BDP2 may have a depth greater than that of the second recession RES2 recessed from the top surface of the second body BDP2. In this description, the term "depth" may be defined to refer to a depth measured in the third direction DR3 of a target object, and "depth of a recession" means the length of an empty space of the recession from a reference surface in the third direction DR3.

When viewed from the top surface of the second body BDP2, the second part PTP2 on which the third recession RES3 is defined may be lower than the first part PTP1 on which the second recession RES2 is defined.

When viewed in plan, the first recessions RES1 may overlap the second recession RES2.

The second body BDP2 may include one or more of aluminum (Al), stainless steel (SUS), and polycarbonate (PC). However, the second body BDP2 may include various materials without being limited thereto.

The insertions INS may reside on the first recessions RES1 of the first body BDP1. The insertions INS may each have a rectangular shape with long sides extended in the first direction DR1 and short sides extended in the second direction DR2. However, no limitation is imposed on the shape of the insertions INS according to the invention.

When viewed in a vertical direction (e.g., the third direction DR3) to the top surface of the first body BDP1, the first recessions RES1 may have their depths greater than thicknesses of the corresponding insertions INS, respectively. Therefore, when the first body BDP1 and the second body BDP2 are combined (e.g., attached) with each other, the insertions INS may be spaced apart from a bottom surface of the second body BDP2, the bottom surface of which faces the top surface of the first body BDP1.

The insertions INS may include one or more of aluminum (Al), stainless steel (SUS), and polycarbonate (PC). However, the insertions INS according to the invention may include various materials without being limited thereto.

Figure 2:
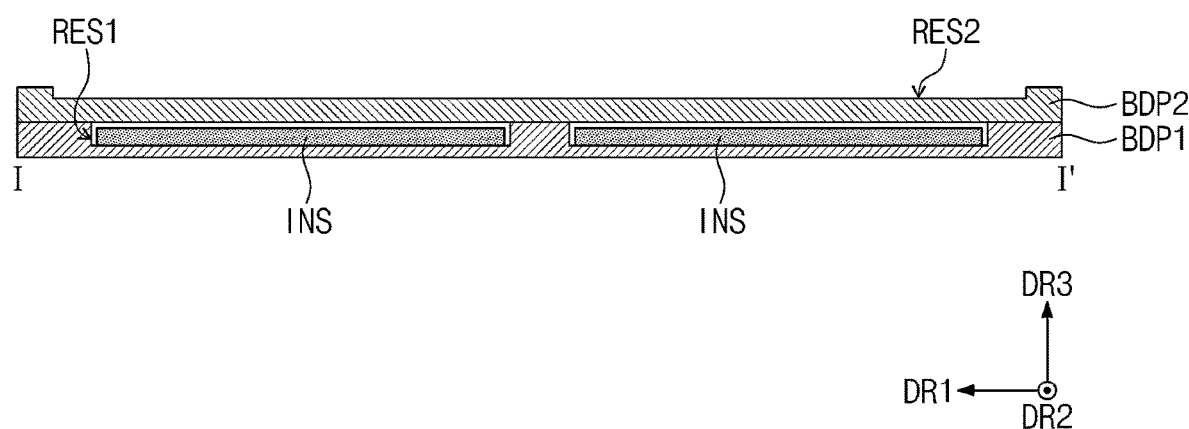
FIG. 2 illustrates a cross-sectional view taken along line I-I' of FIG. 1B.

FIG. 2 illustrates a cross-sectional view taken along line I-I' of FIG. 1B.

Referring to FIG. 2, the first body BDP1 may have inner lateral surfaces that define the first recessions RES1, and the inner lateral surfaces of the first body BDP1 may be directed toward (i.e., face) and spaced apart from lateral surfaces of the insertions INS.

A range of about 0.05 millimeters (mm) to about 0.15 mm may be given as an interval between the lateral surfaces of the insertions INS and the inner lateral surfaces of the first body BDP1 and between top surfaces of the insertions INS and the bottom surface of the second body BDP2. However, no limitation is imposed on the interval between the lateral surfaces of the insertions INS and the inner lateral surfaces of the first body BDP1 and between top surfaces of the insertions INS and the bottom surface of the second body BDP2 according to the invention.

When viewed in plan, the insertions INS may overlap the second recession RES2.

The display module evaluation jig MEJ according to the present invention may be configured such that the first body BDP1, the second body BDP2, the insertions INS between the first and second bodies BDP1 and BDP2, an interval between the insertions INS and the first body BDP1, and an interval between the insertions INS and the second body BDP2 provide a display module evaluation environment similar to an actual environment of a display module set practically used by users.

In an embodiment, for example, when users use smart phones, the smart phone may be impacted with a pen that falls thereto. The smart phone may include a housing and various components attached to a bottom surface of a display module, and the display module may be in contact with or spaced apart from the housing and the components.

For example, the first body BDP1, the second body BDP2, and the insertions INS may correspond to the housing and various components.

The display module evaluation jig MEJ according to the present invention may provide an environment similar to that in which users drop a pen to their smart phones in actual life. The present invention, however, is not limited thereto, and the display module evaluation jig MEJ according to the present invention may be configured such that the first body BDP1, the second body BDP2, and the insertions INS are changed in terms of material, thickness, interval between the first body BDP1 and the insertions INS, and interval between the second body BDP2 and the insertions INS, with the result that it may be possible to provide an evaluation environment similar to various actual environments of a display module set practically used by users.

Figure 3:
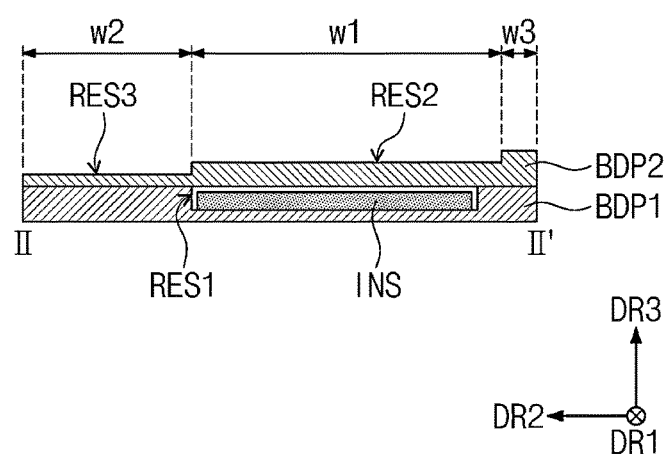
FIG. 3 illustrates a cross-sectional view taken along line II-II' of FIG. 1B.

FIG. 3 illustrates a cross-sectional view taken along line II-II' of FIG. 1B.

Referring to FIG. 3, the lateral surfaces of the insertions INS may be spaced apart from the inner lateral surfaces of the first body BDP1 that define the first recessions RES1. For example, when viewed in plan, the first body BDP1 may be spaced apart from the lateral surfaces of the insertions INS, the lateral surfaces of which define outer edges of the insertions INS.

In the second direction DR2, the second recession RES2 may have a width W1 greater than a width W2 of the third recession RES3. The width W2 of the third recession RES3 may be greater than a width W3 of a portion of the second body BDP2 that does not overlap any of the second and third recessions RES2 and RES3.

When viewed in plan, the first recessions RES1 may not overlap the third recession RES3. The insertions INS may not overlap the third recession RES3.

Figure 4A:
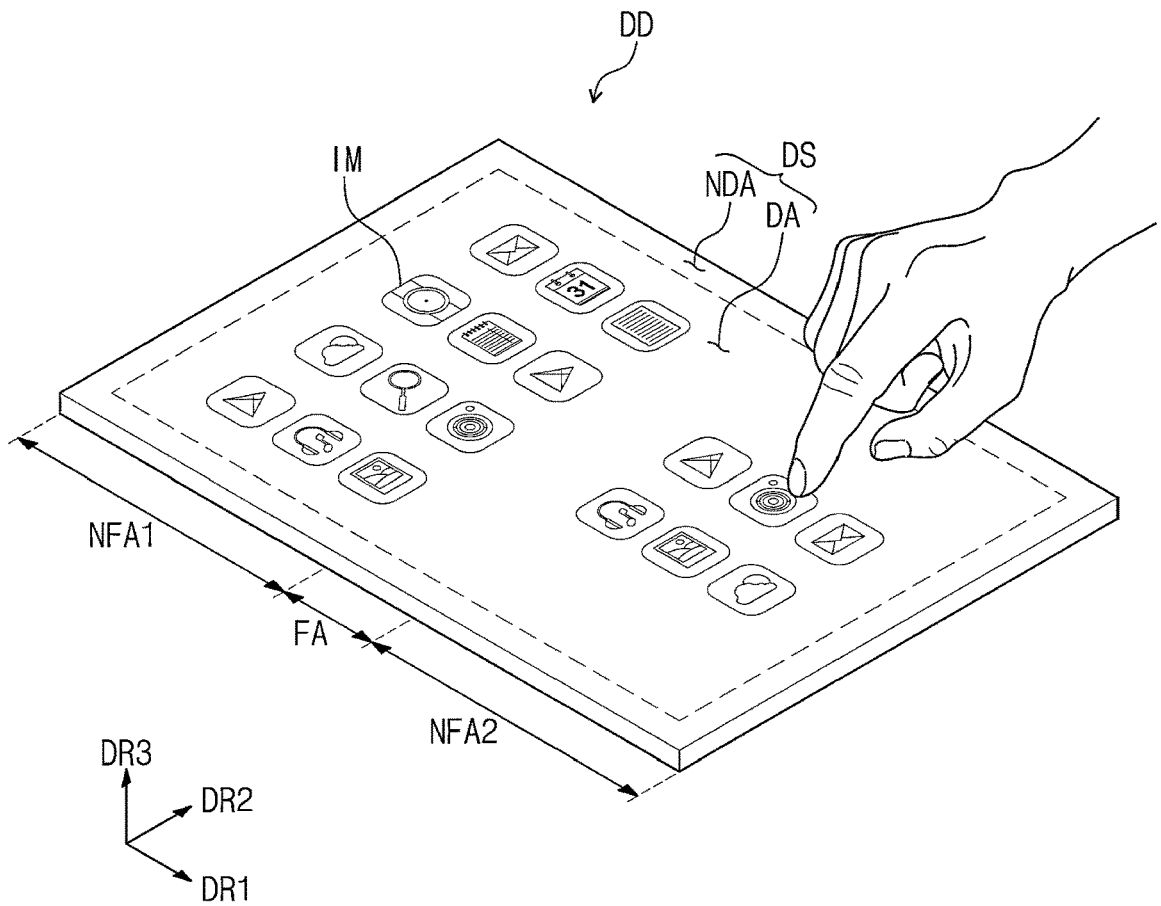
FIG. 4A illustrates a perspective view showing a display device including a display module that is evaluated with a display module evaluation jig according to an embodiment of the present invention.
Figure 4B:
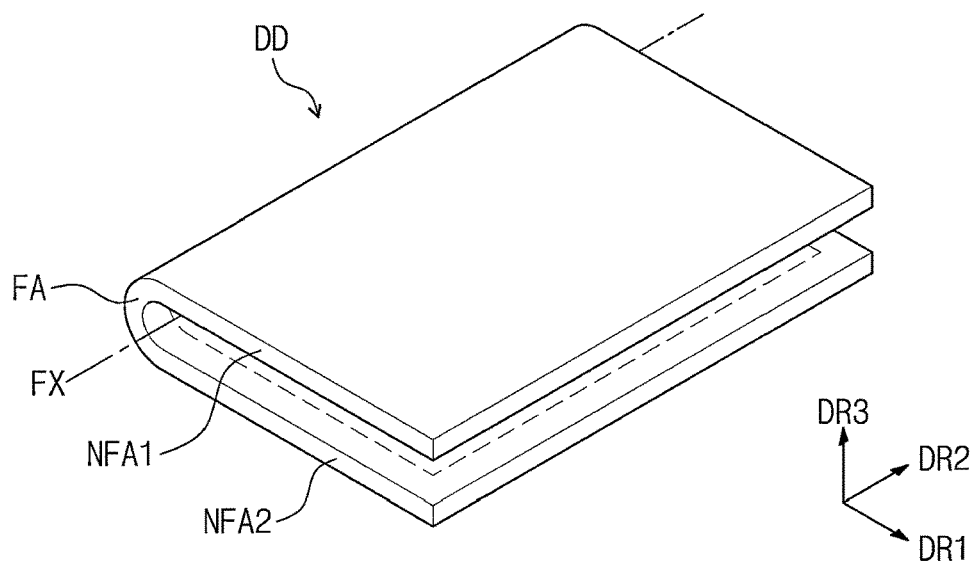
FIG. 4B illustrates a perspective view showing a folded state of the display device depicted in FIG. 4A.

FIG. 4A illustrates a perspective view showing a display device including a display module that is evaluated with a display module evaluation jig according to an embodiment of the present invention. FIG. 4B illustrates a perspective view showing a folded state of the display device depicted in FIG. 4A.

Referring to FIG. 4A, a display device DD may have a rectangular shape with long sides extended in a first direction DR1 and short sides extended in a second direction DR2 that intersects the first direction DR1. The present invention, however, is not limited thereto, and the display device DD may have a circular shape, a polygonal shape, or any other suitable shape in another embodiment. The display device DD may be a flexible display device.

The display device DD may include a folding region FA and a plurality of non-folding regions NFA1 and NFA2. The non-folding regions NFA1 and NFA2 may include a first non-folding region NFA1 and a second non-folding region NFA2. The folding region FA may be disposed between the first non-folding region NFA1 and the second non-folding region NFA2. The folding region FA, the first non-folding region NFA1, and the second non-folding region NFA2 may be arranged in the first direction DR1.

Although one folding region FA and two non-folding regions NFA1 and NFA2 are exemplarily illustrated, but no limitation is imposed on the number of the folding region FA and the number of the non-folding regions NFA1 and NFA2 according to the invention. For example, the display device DD may include more than two non-folding regions and a plurality of folding regions disposed between the non-folding regions in another embodiment.

The display device DD may have a top surface defined as a display surface DS, and the top surface may have a plane defined by the first and second directions DR1 and DR2. The display surface DS may provide users with images IM generated from the display device DD.

The display surface DS may include a display region DA and a non-display region NDA around the display region DA. The display region DA may display an image, and the non-display region NDA may display no image. The non-display region NDA may surround the display region DA and may provide the display device DD with an edge that is printed with a certain color.

Referring to FIG. 4B, the display device DD may be a foldable display device that can be folded or unfolded. For example, the folding region FA may bend about a folding axis FX parallel to the second direction DR2, and in turn the display device DD may become folded. The folding axis FX may be defined as a minor axis parallel to the short side of the display device DD.

When the display device DD is folded, the first non-folding region NFA1 and the second non-folding region NFA2 may face each other, and the display device DD may be in-folded such that the display surface DS is not externally exposed.

Figure 5A:
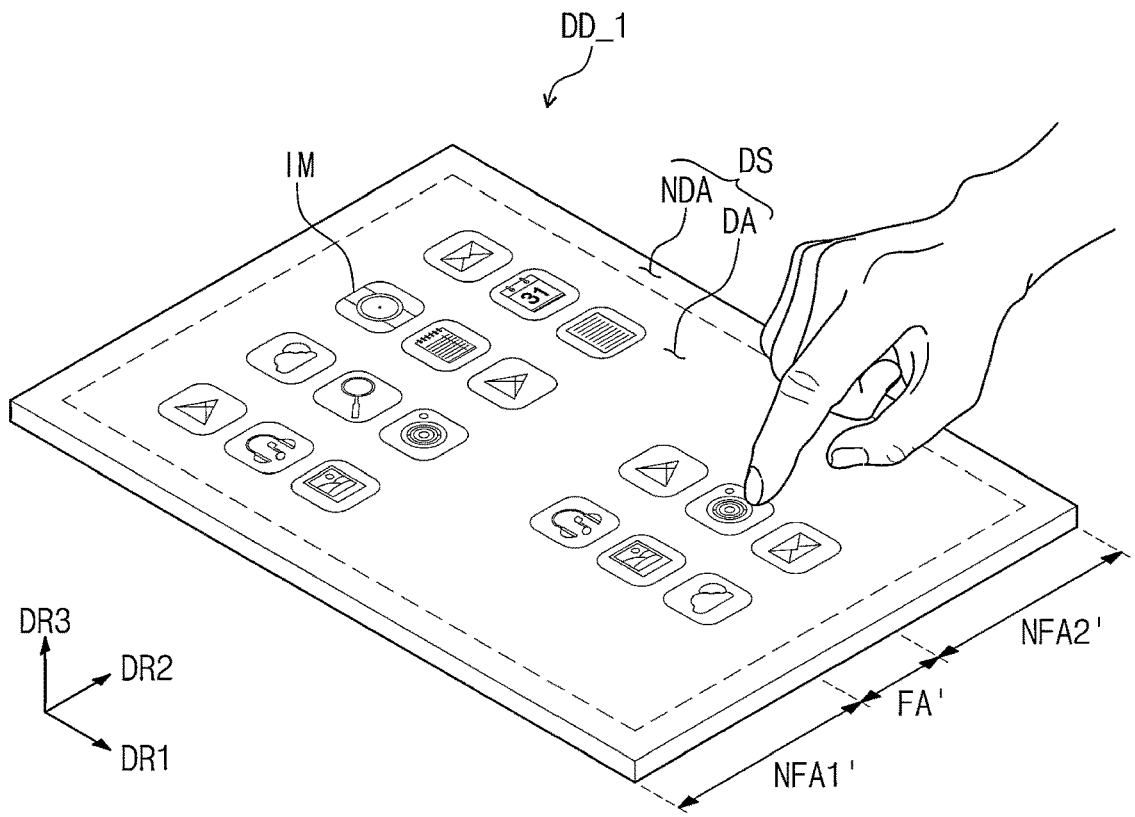
FIG. 5A illustrates a perspective view showing a display device including a display module that is evaluated with a display module evaluation jig according to an embodiment of the present invention.
Figure 5B:
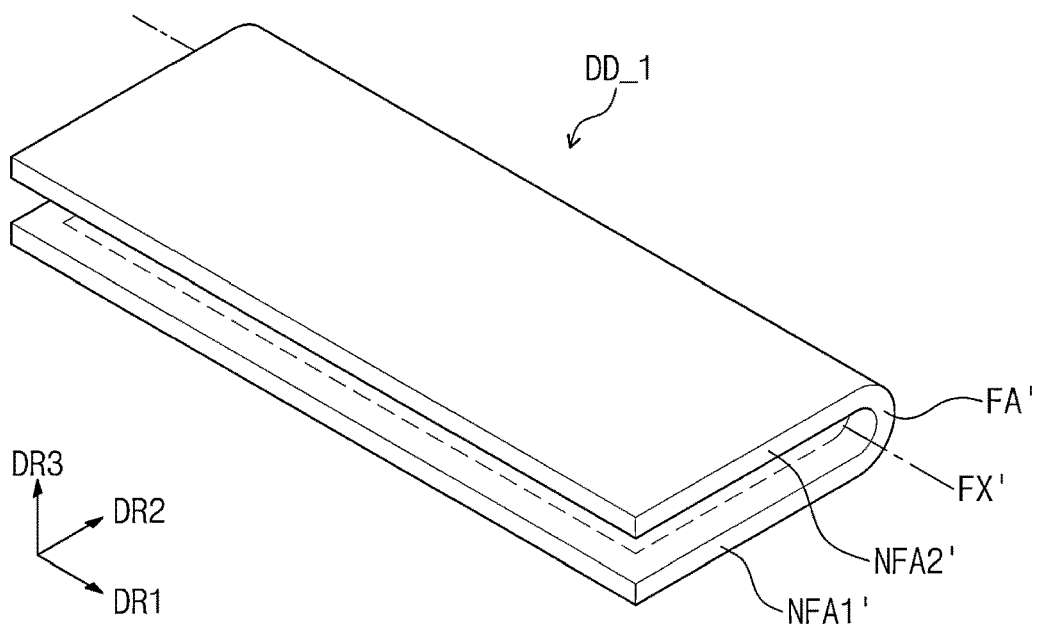
FIG. 5B illustrates a perspective view showing a folded state of the display device depicted in FIG. 5A.

FIG. 5A illustrates a perspective view showing a display device including a display module that is evaluated with a display module evaluation jig according to an embodiment of the present invention. FIG. 5B illustrates a perspective view showing a folded state of the display device depicted in FIG. 5A.

Except for the folding operation, a display device DD_1 depicted in FIG. 5A may have substantially the same configuration as that of the display device DD depicted in FIG. 4A. The following will thus mainly describe a folding operation of the display device DD_1.

Referring to FIGS. 5A and 5B, the display device DD_1 may include a folding region FA' and a plurality of non-folding regions NFA1' and NFA2'. The non-folding regions NFA1' and NFA2' may include a first non-folding region NFA1' and a second non-folding region NFA2'. The folding region FA' may be disposed between the first non-folding region NFA1' and the second non-folding region NFA2'. The folding region FA', the first non-folding region NFA1', and the second non-folding region NFA2' may be arranged in the second direction DR2.

The folding region FA' may bend with respect to a folding axis FX' parallel to the first direction DR1, and in turn the display device DD_1 may become folded. The folding axis FX' may be defined as a major axis parallel to a long side of the display device DD_1. The display device DD of FIG. 1 may be foldable about the minor axis thereof, but the display device DD_1 of FIG. 3 may be foldable about the major axis thereof. The display device DD_1 may fold inwards, or in-fold, to avoid external exposure of the display surface DS.

Figure 6:
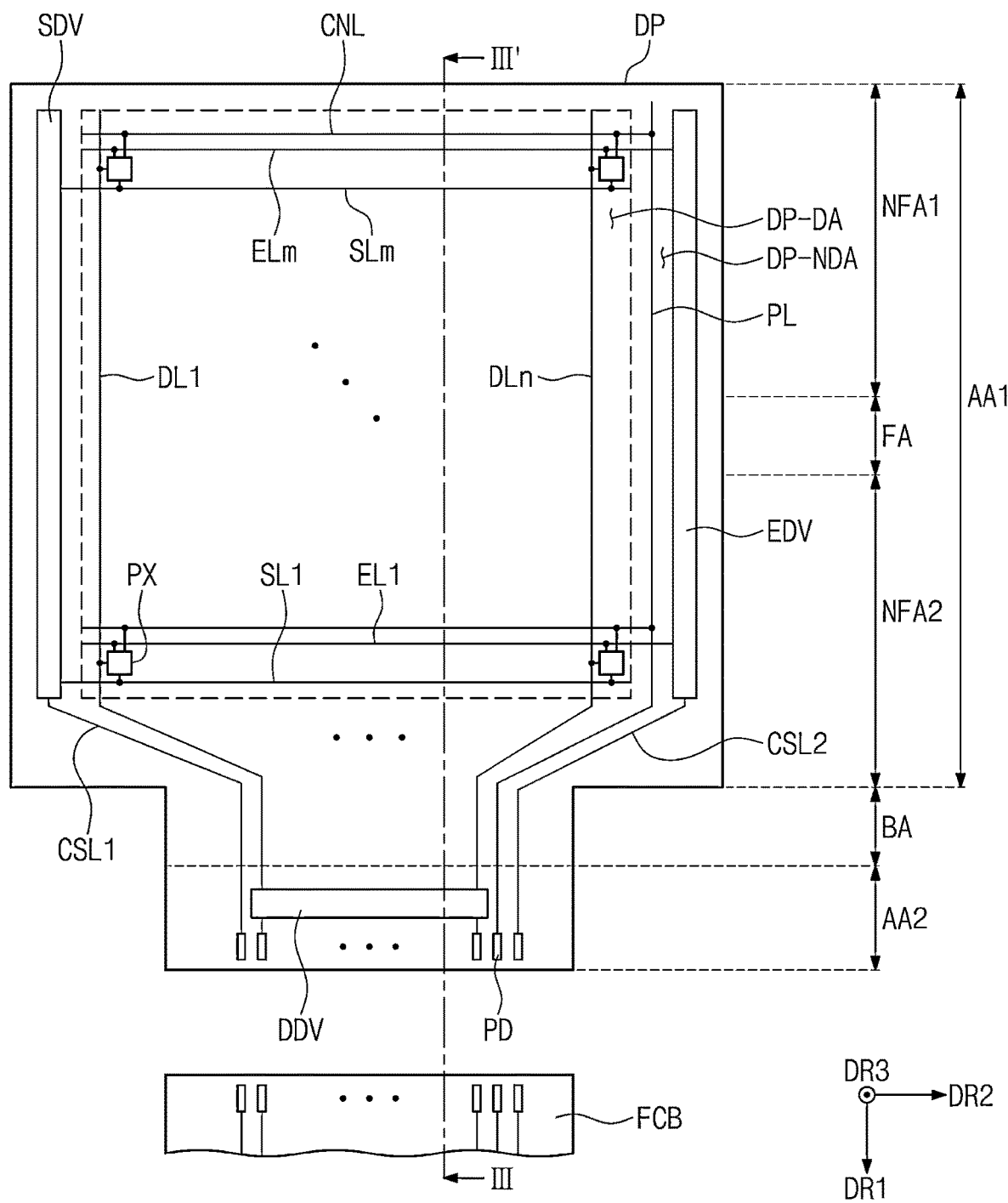
FIG. 6 illustrates a plan view showing a display panel that is evaluated with a display module evaluation jig according to an embodiment of the present invention.

FIG. 6 illustrates a plan view showing a display panel that is evaluated with a display module evaluation jig according to an embodiment of the present invention.

Referring to FIG. 6, the display panel DP may have a display region DP-DA and a non-display region DP-NDA around the display region DP-DA. The display region DP-DA and the non-display region DP-NDA may be divided based on the presence or absence of a pixel PX. The pixel PX may be disposed on the display region DP-DA. A scan driver SDV, a data driver DDV, and an emission driver EDV may be disposed on the non-display region NDA. The data driver DDV may be a portion of circuits configured on a driver chip (see DIC of FIG. 7).

The display panel DP may include a first panel area AA1, a bending area BA, and a second panel area AA2. The second panel area AA2 and the bending area BA may be a portion of the non-display region DP-NDA. The bending area BA may be disposed between the first panel area AA1 and the second panel area AA2.

The first panel area AA1 may be a region that corresponds to the display surface DS of FIG. 5A. The first panel area AA1 may include the first non-folding region NFA1, the second non-folding region NFA2, and the folding region FA.

The bending area BA and the second panel area AA2 may each have a width (or length) in the second direction DR2 less than a width (or length) in the second direction DR2 of the first panel area AA1. It may be relatively easy to bend an area (or region) having a small length in a direction along a bending axis.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, and a plurality of pads PD. The subscripts "m" and "n" are natural numbers. The pixels PX may be connected to the scan lines SL1 to SLm, the data lines DL1 to DLn, and the emission lines EL1 to ELm.

The scan lines SL1 to SLm may extend in the second direction DR2 and may have electrical connection with the scan driver SDV. The data lines DL1 to DLn may extend in the first direction DR1 and may have electrical connection through the bending area BA with the driver chip DIC. The emission lines EL1 to ELm may extend in the second direction DR2 and may have electrical connection with the emission driver EDV.

The power line PL may include a segment that extends in the first direction DR1 and a segment that extends in the second direction DR2. The extending segment in the first direction DR1 may be located at a different level from that of the extending segment in the second direction DR2. The extending segment in the first direction DR1 of the power line PL may extend through the bending area BA toward the second panel area AA2. The power line PL may provide the pixels PX with a first voltage.

The first control line CSL1 may be connected to the scan driver SDV, and may extend through the bending area BA toward a bottom end of the second panel area AA2. The second control line CSL2 may be connected to the emission driver EDV, and may extend through the bending area BA toward the bottom end of the second panel area AA2.

When viewed in plan, the pads PD may be disposed adjacent to the bottom end of the second panel area AA2. The driver chip DIC, the power line PL, the first control line CSL1, and the second control line CSL2 may be electrically connected to the pads PD. A flexible circuit board FCB may be electrically connected to the pads PD through anisotropic conductive adhesion layers.

Figure 7:
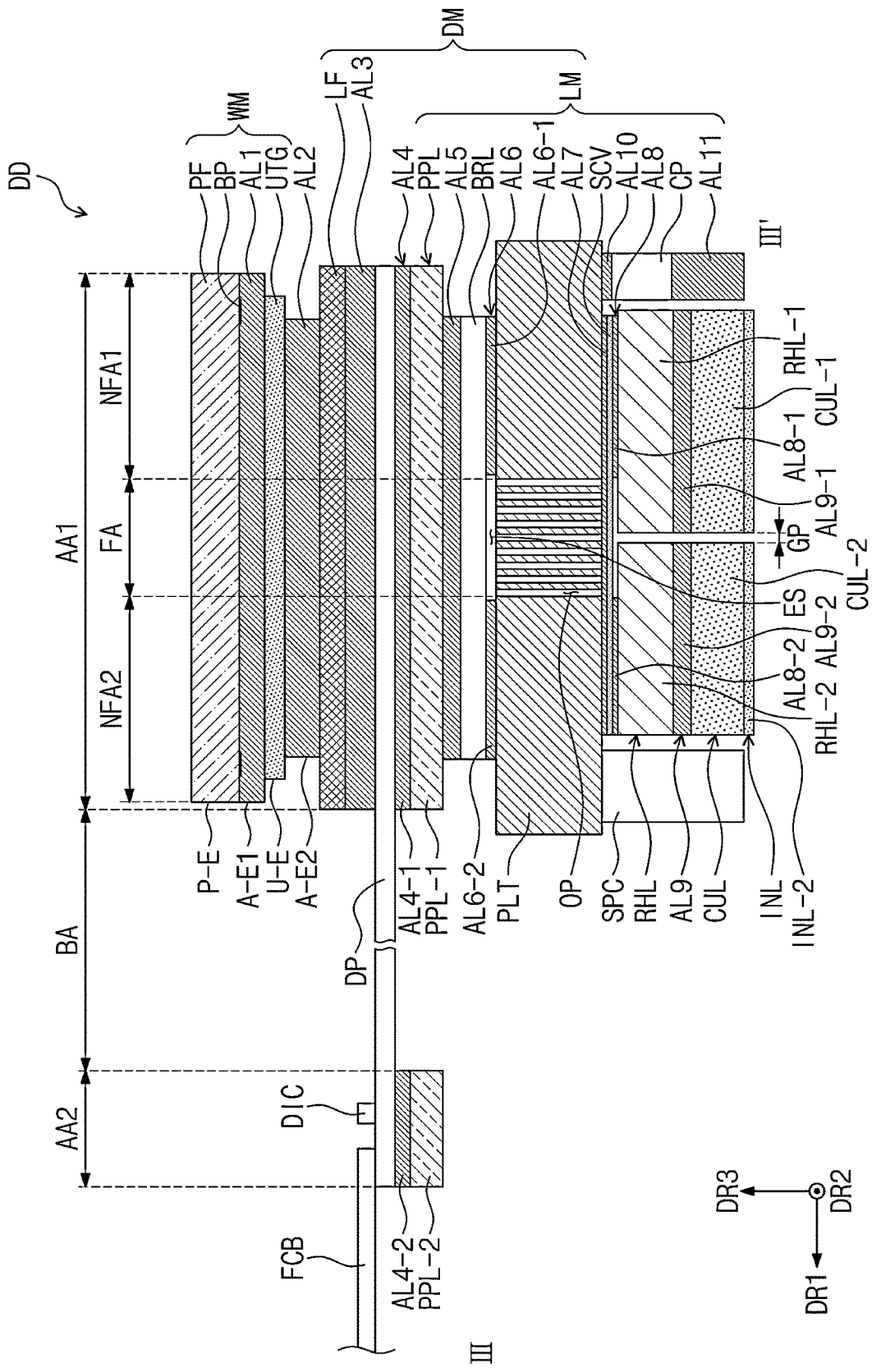
FIG. 7 illustrates a cross-sectional view showing a display panel that is evaluated with a display module evaluation jig according to an embodiment of the present invention.
Figure 8:
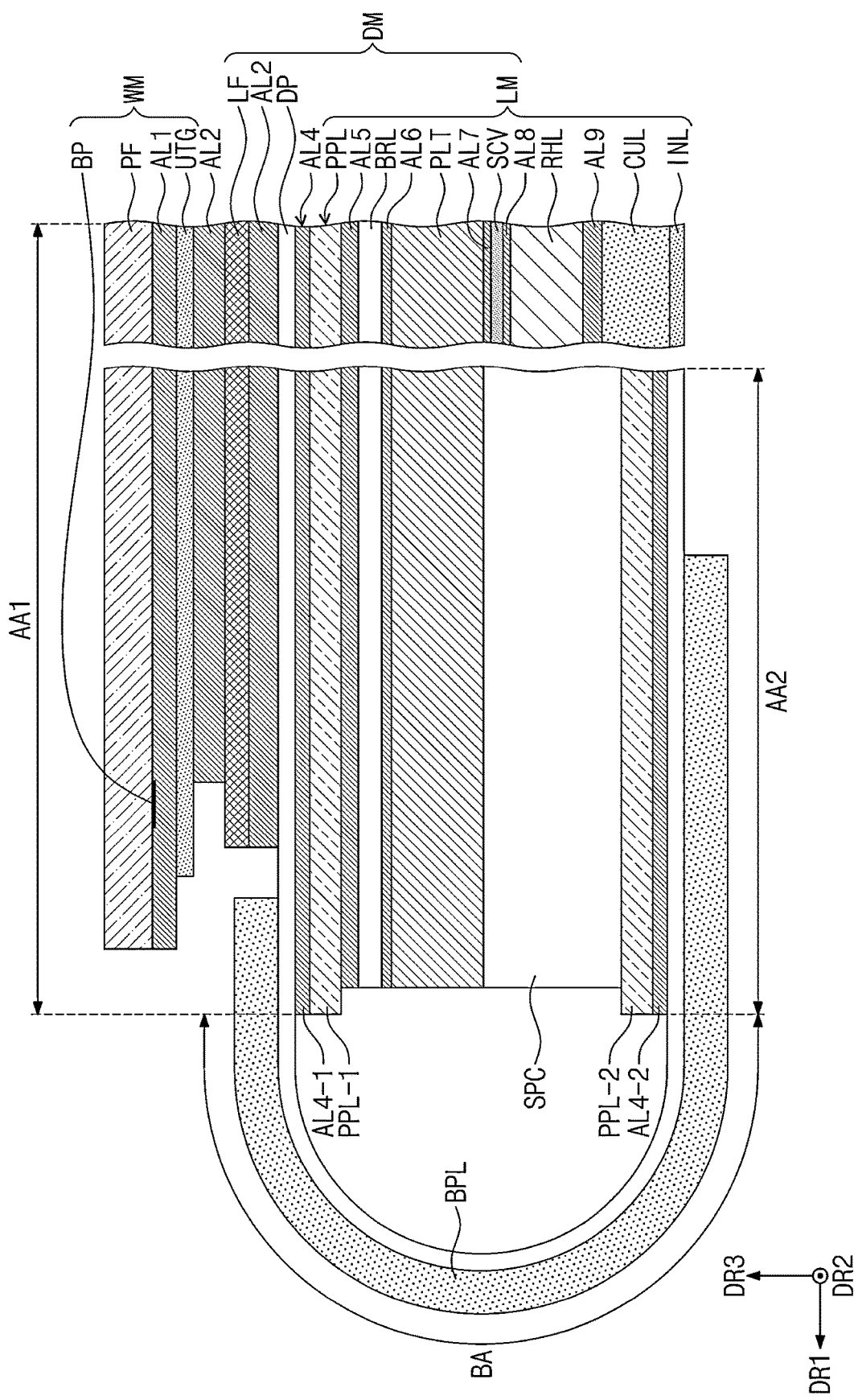
FIG. 8 illustrates a cross-sectional view showing a display panel that is evaluated with a display module evaluation jig according to an embodiment of the present invention.

FIG. 7 illustrates a cross-sectional view showing a display panel that is evaluated with a display module evaluation jig according to an embodiment of the present invention. FIG. 8 illustrates a cross-sectional view showing a display panel that is evaluated with a display module evaluation jig according to an embodiment of the present invention.

FIG. 7 shows a state in which the display device DD is not yet installed on an electronic apparatus, and FIG. 8 shows a state in which the display device DD is installed on an electronic apparatus. The cross-sectional view of FIG. 7 may include a cross-section taken along line of FIG. 6.

Referring to FIG. 8, when the display device DD is installed on an electronic apparatus, the first and second panel areas AA1 and AA2 of the display panel DP may be disposed on planes different from each other. The second panel area AA2 may be placed below the first panel area AA1.

Referring to FIGS. 7 and 8, a window module WM may include a window UTG, a protection film PF disposed on the window UTG, a first adhesion layer AL1 that combines (i.e., attaches) the window UTG with the protection film PF, and a bezel pattern BP.

The bezel pattern BP may overlap the non-display region NDA of FIG. 1A. The bezel pattern BP may be disposed on either one surface of the window UTG or one surface of the protection film PF. FIG. 7 depicts by way of example the bezel pattern BP disposed on a bottom surface of the protection film PF. The present invention, however, is not limited thereto, and the bezel pattern BP may be disposed on a top surface of the protection film PF. The bezel pattern BP may a colored light-shield layer and may be formed by, for example, a coating method. The bezel pattern BP may include a base material and a dye or pigment mixed in the base material. The bezel pattern BP may have a closed line shape when viewed in plan.

The window UTG may be a chemically tempered glass. The window UTG may have optically transparent properties.

The protection film PF may include polyimide, polycarbonate, polyamide, triacetylcellulose, polymethylmethacrylate, or polyethylene terephthalate. Although not shown, the protection film PF may be provided on its top surface with at least one selected from a hard coating layer, an anti-fingerprint layer, and an anti-reflection layer.

The first adhesion layer AL1 may be a pressure sensitive adhesive ("PSA") film or an optically clear adhesive ("OCA"). The following-described adhesion layers may also be identical to the first adhesion layer AL1 and may include an ordinary adhesive. The first adhesion layer AL1 may have a shape that corresponds to that of the window UTG that has undergone a slimming process. On surface of the window UTG may all be adhered to the first adhesion layer AL1.

The first adhesion layer AL1 may have a thickness enough to cover the bezel pattern BP. For example, the bezel pattern BP may have a thickness of about 3 micrometers to about 8 micrometers, and the first adhesion layer AL1 may have a thickness enough to suppress the formation of bubble in the vicinity of the bezel pattern BP. The first adhesion layer AL1 may have a thickness of about 20 micrometers to about 50 micrometers, for example, a thickness of about 35 micrometers.

The first adhesion layer AL1 may be separated from the window UTG. The protection film PF may have strength less than that of the window UTG, and thus scratches may be relatively easily produced. After the separation of the first adhesion layer AL1 and the protection film PF, a protection film PF may be newly attached to the window UTG.

When viewed in plan, an edge U-E of the window UTG may not overlap the bezel pattern BP. As the conditions above are satisfied, the edge U-E of the window UTG may be exposed from the bezel pattern BP.

When viewed in plan, an edge P-E of the protection film PF may be aligned with an edge A-E1 of the first adhesion layer AL1 The protection film PF and the first adhesion layer AL1 may have the same area and shape.

The window module WM may be combined through a second adhesion layer AL2 with a display module DM. The second adhesion layer AL2 may include a pressure sensitive adhesive or a transparent adhesive such as an optically clear adhesive.

When viewed in plan, an edge A-E2 of the second adhesion layer AL2 may overlap the window module WM. For example, the edge A-E2 of the second adhesion layer AL2 may overlap the window UTG in a plan view. A pressure may be applied to the second adhesion layer AL2 in a process where the window module WM and the display module DM are attached to each other. The second adhesion layer AL2 may be pressurized to expand in a direction parallel to the first and second directions DR1 and DR2. In this case, in order not to allow the second adhesion layer AL2 to protrude more than the window UTG, the second adhesion layer AL2 may have an area less than that of the window UTG.

The display module DM may include an optical film LF, a display panel DP, a panel protection layer PPL, a barrier layer BRL, a support layer PLT, a cover layer SCV, a thermal radiation layer RHL, a cushion layer CUL, a dielectric layer INL, a spacer SPC, a step compensation pattern CP, and third to eleventh adhesion layers AL3 to AL11. The third to eleventh adhesion layers AL3 to AL11 may include a pressure sensitive adhesive or a transparent adhesive such as an optically clear adhesive. In an embodiment of the present invention, one or more of the components mentioned above may be omitted, or one or more other components may be additionally added. In addition, the stacking sequence depicted in FIG. 7 is a merely exemplary sequence, and the stacking sequence of the components may be changed.

The optical film LF may be disposed on the first panel area AA1. The optical film LF may cover at least the display region (see DP-DA of FIG. 6). The second adhesion layer AL2 may be attached to the optical film LF and the window module WM, and the third adhesion layer AL3 may be attached to the optical film LF and the display panel DP.

The panel protection layer PPL may be disposed below the display panel DP. The panel protection layer PPL may protect a lower portion of the display panel DP. The panel protection layer PPL may include a flexible plastic material. The panel protection layer PPL may prevent the occurrence of scratch on a rear surface of the display panel DP during its fabrication. The panel protection layer PPL may be a colored polyimide film. For example, the panel protection layer PPL may be an opaque yellow film, but the present invention is not limited thereto.

In an embodiment of the present invention, the panel protection layer PPL may not be disposed on the bending area BA. The panel protection layer PPL may include a first panel protection layer PPL-1 that protects the first panel area AA1 of the display panel DP and a second panel protection layer PPL-2 that protects the second panel area AA2 of the display panel DP. When bending area BA is bent, the second panel protection layer PPL-2 together with the second panel area AA2 of the display panel DP may be disposed below the first panel area AA1 and the first panel protection layer PPL-1. Because the panel protection layer PPL is not disposed on the bending area BA, the bending area BA may easily bend.

The fourth adhesion layer AL4 may combine the panel protection layer PPL and the display panel DP with each other. The fourth adhesion layer AL4 may include a first part AL4-1 that corresponds to the first panel protection layer PPL-1 and a second part AL4-2 that corresponds to the second panel protection layer PPL-2. The first part AL4-1 may combine the first panel protection layer PPL-1 with the first panel area AA1 of the display panel DP, and the second part AL4-2 may combine the second panel protection layer PPL-2 with the second panel area AA2 of the display panel DP.

The barrier layer BRL may be disposed below the panel protection layer PPL. The fifth adhesion layer AL5 may be disposed between the panel protection layer PPL and the barrier layer BRL, thereby combining the barrier layer BRL with the panel protection layer PPL. The fifth adhesion layer AL5 may be attached to a top surface of the barrier layer BRL and may be called an upper adhesion layer.

The barrier layer BRL may increase resistance to a compressive force caused by external suppression. Therefore, the barrier layer BRL may serve to prevent the display panel DP from being deformed. The barrier layer BRL may include a flexible plastic material, such as polyimide or polyethylene terephthalate.

In addition, the barrier layer BRL may absorb externally incident light. The barrier layer BRL may include a light-shield material and may be a colored film whose light transmittance is low. For example, the barrier layer BRL may be a black plastic film, for example, a black polyimide film. When the display module DM is viewed from a top side of the window module WM, components disposed below the barrier layer BRL may not be visible to users.

The support layer PLT may be disposed below the barrier layer BRL. The support layer PLT may support components disposed thereon, and may maintain an unfolded or folded state of the display device DD. The support layer PLT may include a material whose Young's modulus is equal to or greater than about 60 gigapascals (GPa). The support layer PLT may include a metallic material such as a stainless steel. For example, the support layer PLT may include SUS 304, but the present invention is not limited thereto, and the support layer PLT may include various metallic materials. The support layer PLT may support the display panel DP. The support layer PLT may allow the display device DD to have increased thermal radiation performance.

The support layer PLT may define a plurality of openings OP defined in its partial region that corresponds to the folding region FA. The openings OP may increase flexibility of the support layer PLT.

In an embodiment of the present invention, the support layer PLT may include a first support part that corresponds to the first non-folding region NFA1 and has dielectric properties, and may also include a second support part that corresponds to the second non-folding region NFA2 and has dielectric properties. The first support part and the second support part may be spaced apart from each other in the first direction DR1. In this case, the support layer PLT may further include a folding part which corresponds to the folding region FA, which is disposed between the first support part and the second support part, and in which the plurality of openings OP are defined.

The first support part and the second support part may include nonmetallic materials, plastic, fiberglass reinforced plastic, or glass. The plastic may include polyimide, polyethylene, or polyethylene terephthalate, but the present invention is not particularly limited thereto. The first support part and the second support part may include the same material. The folding region FA may include a material the same as or different from that of the first and second support parts. For example, the folding region FA may include a material whose Young's modulus is equal to or greater than about 60 GPa, for example, a metallic material such as a stainless steel. For example, the folding region FA may include SUS 304, but the present invention is not limited thereto, and the folding region FA may include various metallic materials.

The barrier layer BRL may have an area less than that of the support layer PLT. The areas may be planar areas. When viewed in plan, the barrier layer BRL may overlap a portion of the support layer PLT. Another portion of the support layer PLT may not overlap the barrier layer BRL in the plan view.

The sixth adhesion layer AL6 may be disposed between the barrier layer BRL and the support layer PLT. The sixth adhesion layer AL6 may combine the barrier layer BRL and the support layer PLT with each other.

The sixth adhesion layer AL6 may include a first part AL6-1 and a second part AL6-2 that are spaced apart from each other.

The first part AL6-1 and the second part AL6-2 may be spaced apart from each other across the plurality of openings OP. When viewed in plan, the sixth adhesion layer AL6 may not overlap any of the plurality of openings OP. In addition, when viewed in plan, the sixth adhesion layer AL6 may be spaced apart from the plurality of openings OP.

The first part AL6-1 may overlap the first non-folding region NFA1, the second part AL6-2 may overlap the second non-folding region NFA2, and each of the first and second parts AL6-1 and AL6-2 may not overlap the folding region FA in a plan view. In an embodiment, the sixth adhesion layer AL6 may be absent on a region that corresponds to the folding region FA, and thus the support layer PLT may increase in flexibility.

On a region that overlaps the folding region FA, the barrier layer BRL may be spaced apart from the support layer PLT. For example, the region that overlaps the folding region FA may define an empty space ES defined between the support layer PLT and the barrier layer BRL. Air may be disposed in the empty space ES.

When the display device DD folds, because the empty space ES is defined between the barrier layer BRL and the support layer PLT, shapes of the plurality of openings OP defined in the support layer PLT may not be visible outside the display device DD.

In addition, because the barrier layer BRL includes a light-shield material or a colored film whose light transmittance is low, a color difference of the support layer PLT may not be externally visible. For example, a difference in color may not be externally visible between a first support area in which the plurality of openings OP are defined and a second support area in which the plurality of openings OP are not defined. The first support area may be a region that overlaps the folding region FA, and the second support area may be a region that overlaps the first non-folding region NFA1 and the second non-folding region NFA2.

The sixth adhesion layer AL6 may have a thickness less than that of the fifth adhesion layer AL5.

A reduction in thickness of the sixth adhesion layer AL6 may decrease a step difference caused by the sixth adhesion layer AL6. The decrease in step difference may advantageously cause a reduction in shape variation of stacking structures that is resulting from folding and unfolding operations of the display device DD, but the plurality of openings OP may be visible or the sixth adhesion layer AL6 may be detached due to repetitive folding operations. An increase in thickness of the sixth adhesion layer AL6 may cause the plurality of openings OP to become invisible and may allow the sixth adhesion layer AL6 to have increased reliability of adhesive force even in repetitive folding operations, but the increase in thickness of the sixth adhesion layer AL6 may increase the step difference. Accordingly, the thickness of the sixth adhesion layer AL6 may be selected within an appropriate range in consideration of folding reliability, adhesion reliability, and visibility of the plurality of openings OP.

The seventh adhesion layer AL7 may be disposed below the support layer PLT, and the cover layer SCV may be disposed below the seventh adhesion layer AL7. The seventh adhesion layer AL7 may combine the support layer PLT and the cover layer SCV with each other. The cover layer SCV may be formed to have a sheet shape and may be attached to the support layer PLT.

The seventh adhesion layer AL7 and the cover layer SCV may cover the plurality of openings OP defined in the support layer PLT. Therefore, the cover layer SCV may prevent introduction of foreign substances into the plurality of openings OP. The cover layer SCV may have Young's modulus less than that of the support layer PLT. For example, the cover layer SCV may include thermoplastic polyurethane, rubber, or silicon, but the present invention is not limited thereto.

The eighth adhesion layer AL8 may be disposed below the cover layer SCV. The eighth adhesion layer AL8 may include a first part AL8-1 and a second part AL8-2. The first part AL8-1 and the second part AL8-2 may be spaced apart from each other. When viewed in plan, the first part AL8-1 and the second part AL8-2 may be spaced apart from each other across the plurality of openings OP. The first part AL8-1 and the second part AL8-2 may not overlap each other on the folding region FA.

The thermal radiation layer RHL may be disposed below the eighth adhesion layer AL8. The thermal radiation layer RHL may be a sheet whose thermal conductivity is high. The thermal radiation layer RHL may include metal or its alloy, for example, copper, copper alloy, or graphite.

The thermal radiation layer RHL may include a first thermal radiation layer RHL-1 and a second thermal radiation layer RHL-2. The first thermal radiation layer RHL-1 and the second thermal radiation layer RHL-2 may be spaced apart from each other at a certain interval GP. The certain interval GP may range from about 0.4 millimeters to about 2.4 millimeters, but the present invention is not particularly limited thereto. The certain interval GP may be disposed to correspond to the folding region FA.

The first thermal radiation layer RHL-1 may be combined through the first part AL8-1 with the cover layer SCV, and the second thermal radiation layer RHL-2 may be combined through the second part AL8-2 with the cover layer SCV. When viewed in plan, the first thermal radiation layer RHL-1 may overlap the first non-folding region NFA1 and a portion of the folding region FA, and the second thermal radiation layer RHL-2 may overlap the second non-folding region NFA2 and another portion of the folding region FA.

When viewed in plan, a portion of the first thermal radiation layer RHL-1 may overlap a portion of the plurality of openings OP, and a portion of the second thermal radiation layer RHL-2 may overlap another portion of the plurality of openings OP. The first and second thermal radiation layers RHL-1 and RHL-2 may serve to support the support layer PLT. For example, a region where the plurality of openings OP of the support layer PLT is defined may be supported by the first thermal radiation layer RHL-1 and the second thermal radiation layer RHL-2. Therefore, the first thermal radiation layer RHL-1 and the second thermal radiation layer RHL-2 may be called a first lower support layer and a second lower support layer.

The ninth adhesion layer AL9 may be disposed below the thermal radiation layer RHL. The ninth adhesion layer AL9 may include a first part AL9-1 that corresponds to the first thermal radiation layer RHL-1 and a second part AL9-2 that corresponds to the second thermal radiation layer RHL-2.

The first part AL9-1 and the second part AL9-2 may be spaced apart from each other at a certain interval GP.

The cushion layer CUL may be disposed below the ninth adhesion layer AL9. The cushion layer CUL may absorb external impact and may protect the display panel DP. The cushion layer CUL may have Young's modulus less than that of the support layer PLT. The cushion layer CUL may include a resilient foam sheet. The cushion layer CUL may include sponge or polyurethane.

The cushion layer CUL may include a first cushion layer CUL-1 that corresponds to the first part AL9-1 and a second cushion layer CUL-2 that corresponds to the second part AL9-2. The first cushion layer CUL-1 and the second cushion layer CUL-2 may be spaced apart from each other at a certain interval GP. When viewed in plan, the certain interval GP between the first and second cushion layers CUL-1 and CUL-2 may overlap the folding region FA. When viewed in plan, the first cushion layer CUL-1 may overlap the first non-folding region NFA1 and a portion of the folding region FA, and the second cushion layer CUL-2 may overlap the second non-folding region NFA2 and another portion of the folding region FA.

The dielectric layer INL may be disposed below the cushion layer CUL. FIG. 7 shows an example in which a dielectric tape is disposed. The dielectric layer INL may prevent introduction of static electricity. Although not shown in FIG. 7, a flexible circuit board may be disposed on the dielectric layer INL. The dielectric layer INL may prevent electrical interference between the flexible circuit board and members disposed on the dielectric layer INL.

One surface of the step compensation pattern CP may be combined through the tenth adhesion layer AL10 with the support layer PLT. The eleventh adhesion layer AL11 may be disposed on another surface of the step compensation pattern CP. The eleventh adhesion layer AL11 may be used to combine the display device DD with another configuration.

Referring to FIG. 8, the bending area BA may bend to allow the second panel area AA2 to reside below the first panel area AA1. Therefore, the driver chip (see DIC of FIG. 7) may be disposed below the first panel area AA1. For example, the first panel area AA1 and the second panel area AA2 may be located at levels (or reference planes) different from each other.

A bending protection layer BPL may be disposed on at least the bending area BA. The bending protection layer BPL may overlap the bending area BA in a plan view, the first panel area AA1, and the second panel area AA2. The bending protection layer BPL may be disposed not only on the bending area BA, but also on a portion of the first panel area AA1 and a portion of the second panel area AA2.

The bending protection layer BPL may bend together with the bending area BA. The bending protection layer BPL may protect the bending area BA against external impact and may control a neutral surface of the bending area BA. The bending protection layer BPL may control a stress of the bending area BA so as to allow signal lines on the bending area BA to adjoin the neutral surface.

The second panel protection layer PPL-2 may have one surface to which the second part AL4-2 of the fourth adhesion layer AL4 is not attached, and the one surface of the second panel protection layer PPL-2 may be attached to the spacer SPC. FIGS. 7 and 8 depict that the spacer SPC is illustrated as a single layer, but the spacer SPC may have a multi-layered structure in which a base layer is disposed between two adhesion layers. The base layer may include graphite whose thermal radiation properties are excellent.

Figure 9:
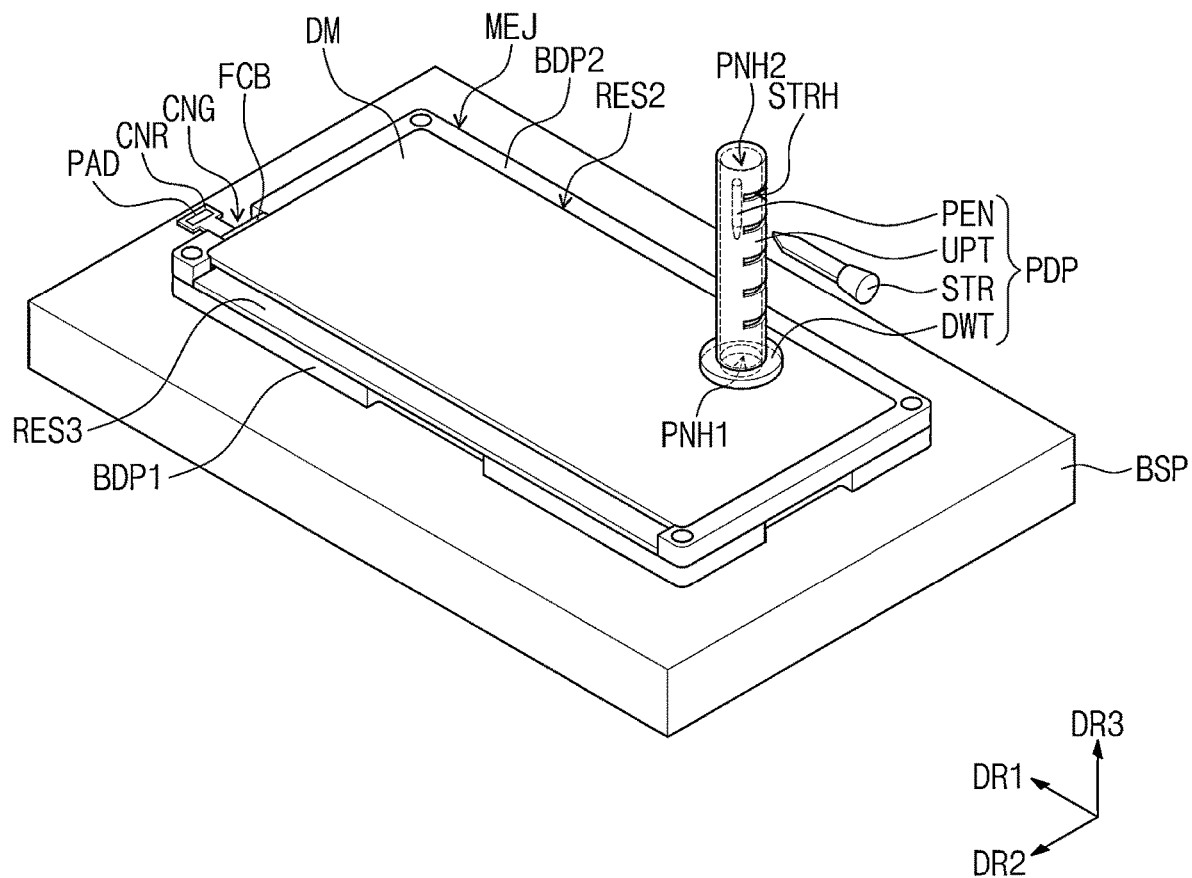
FIG. 9 illustrates a perspective view showing a display module evaluation jig according to an embodiment of the present invention.

FIG. 9 illustrates a perspective view showing a display module evaluation jig according to an embodiment of the present invention.

Referring to FIG. 9, the display module evaluation jig MEJ may be disposed on a base layer BSP (in other words, "base plate").

The base layer BSP may include a stone surface plate. However, no limitation is imposed on the material of the base layer BSP according to the invention.

The display module DM may be disposed on the second body BDP2 of the display module evaluation jig MEJ. The display module DM may be placed on the first part (see PTP1 of FIGS. 1A and 1B) of the second body BDP2.

The flexible circuit board FCB of the display module DM may be placed on the second part (see PTP2 of FIGS. 1A and 1B) of the second body BDP2. When viewed in plan, the flexible circuit board FCB may overlap the third recession RES3. Because the flexible circuit board FCB is disposed on the third recession RES3 lower than the second recession RES2, a top surface of the display module DM may be placed parallel with a top surface of the base layer BSP. For example, the top surface of the display module DM may be disposed parallel to the first and second directions DR1 and DR2 that are perpendicular to the third direction DR3. Therefore, a constant height (or level) may be provided between a fixed level and the top surface of the display module DM, which may increase experimental accuracy.

A connector CNR attached to the flexible circuit board FCB may be disposed on a connecting groove CNG. The connector CNR may be electrically connected through the flexible circuit board FCB to the display module DM. The connector CNR may extend in the first direction DR1 from the flexible circuit board FCB and may protrude from the display module evaluation jig MEJ.

The connector CNR may include a connection pad PAD. Although not shown, the connector CNR may be electrically connected through the connection pad PAD to a driving apparatus. The connector CNR may transfer electrical signals to the display module DM.

A pen dropper PDP may be disposed on the display module DM. The pen dropper PDP may include an upper tube UPT, a lower tube DWT, a stopper STR, and a pen PEN.

The lower tube DWT may have a plane defined by the first and second directions DR1 and DR2, and may be shaped like a cylinder that extends in the third direction DR3. However, no limitation is imposed on the shape of the lower tube DWT according to the invention.

When viewed in plan, a first pen hole PNH1 may be defined in a central portion of the lower tube DWT.

The upper tube UPT may be disposed on the lower tube DWT. The upper tube UPT may have a plane defined by the first and second directions DR1 and DR2, and may be shaped like a cylinder that extends in the third direction DR3. However, no limitation is imposed on the shape of the upper tube UPT according to the invention.

When viewed in plan, a second pen hole PNH2 may be defined in a central portion of the upper tube UPT. The second pen hole PNH2 may be spatially connected to the first pen hole PNH1.

A plurality of stopper holes STRH may be defined on one lateral surface of the upper tube UPT. The stopper holes STRH may be spaced apart from each other at a regular interval in the third direction DR3.

The stopper STR may be disposed in one of the stopper holes STRH. The stopper STR may be inserted in the upper tube UPT through one of the stopper holes STRH, thereby closing the second pen hole PNH2.

The pen PEN may be disposed in the upper tube UPT. The pen PEN may be inserted through the second pen hole PNH2 into the upper tube UPT and may be disposed on the stopper STR in the upper tube UPT. A height (or level) of the pen PEN may be defined to refer to a distance in the third direction DR3 from the display module DM, and the height of the pen PEN may be adjusted by the stopper STR inserted into the upper tube UPT.

Figure 10A:
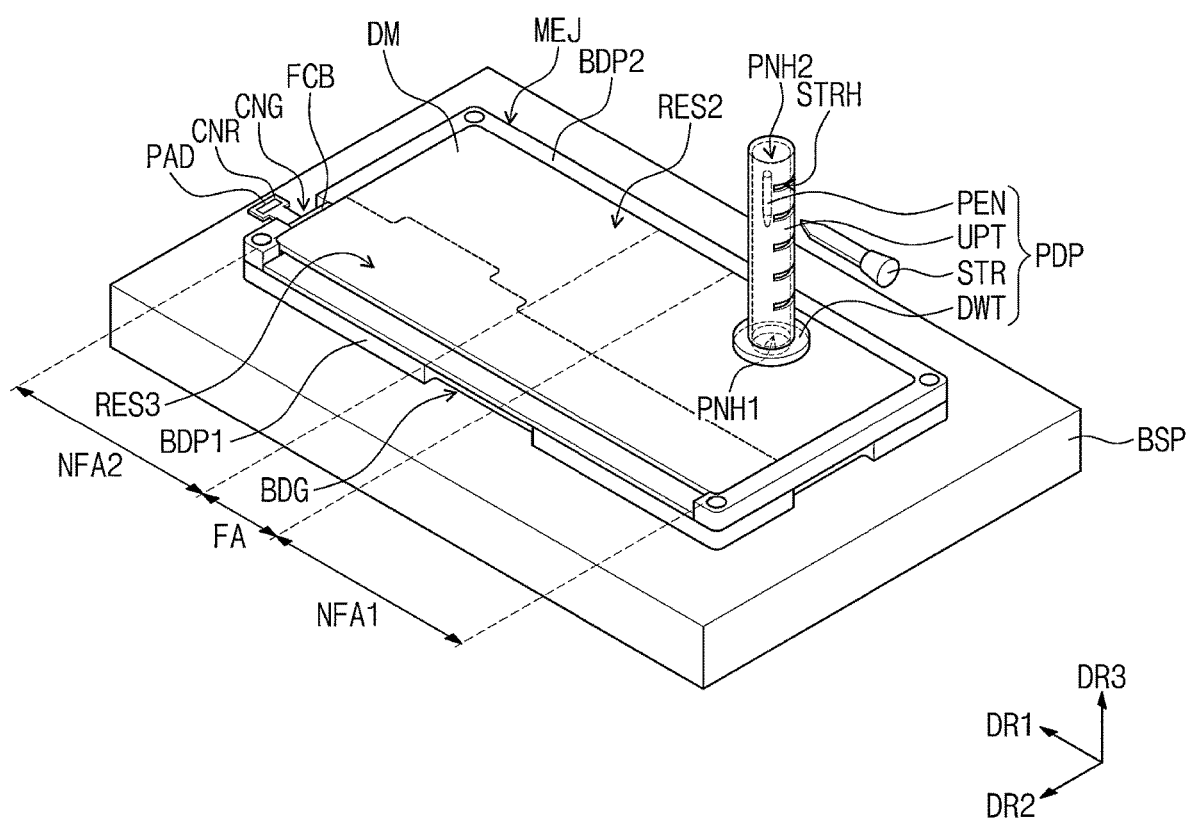
FIG. 10A illustrates a perspective view showing a non-folding region of a display module that is evaluated with a pen dropper.
Figure 10B:
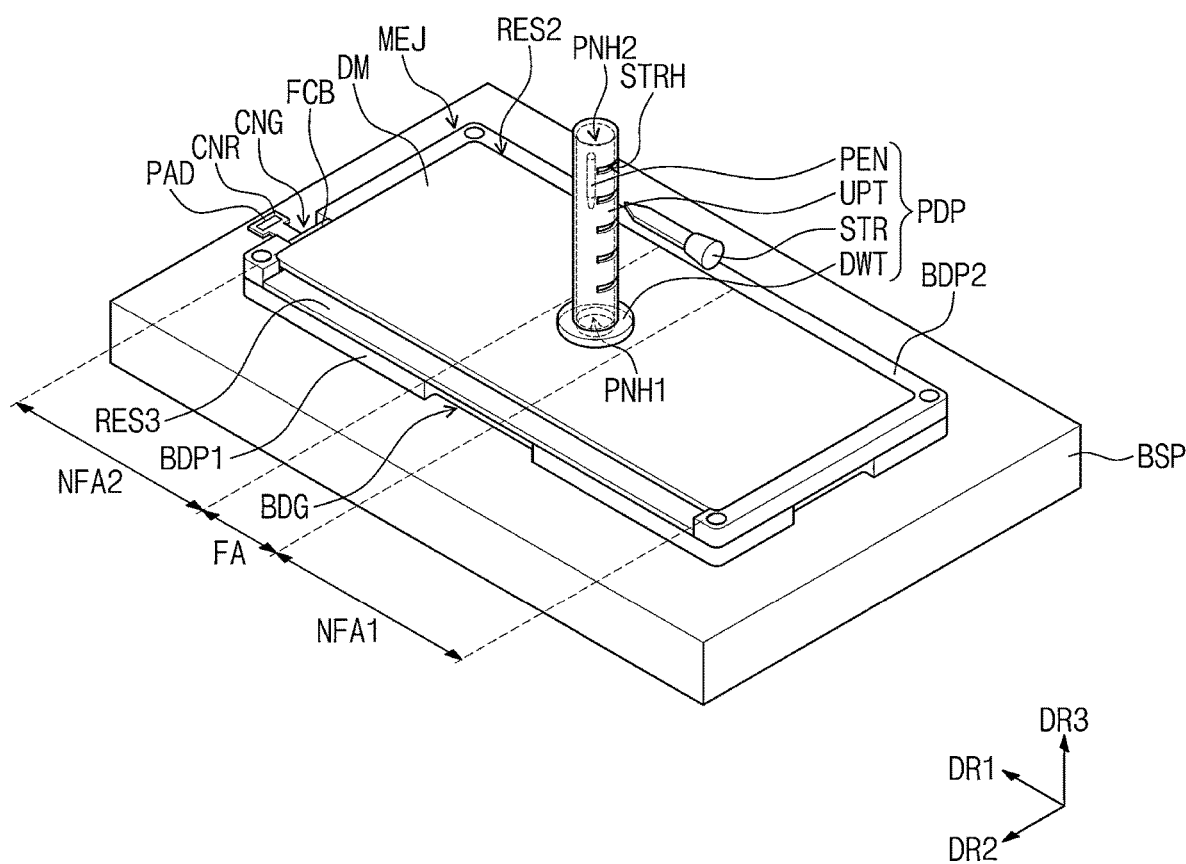
FIG. 10B illustrates a perspective view showing a folding region of a display module that is evaluated with a pen dropper.

FIG. 10A illustrates a perspective view showing a non-folding region of a display module that is evaluated with a pen dropper. FIG. 10B illustrates a perspective view showing a folding region of a display module that is evaluated with a pen dropper.

Referring to FIG. 10A, the folding region FA of the display module DM may be disposed on the bending grooves BDG. The folding region FA of the display module DM may be visible through the bending grooves BDG.

The pen dropper PDP may be disposed on the display module DM that overlaps the second recession RES2 in a plan view. The pen dropper PDP may be placed on the first non-folding region NFA1. The pen PEN may drop from the pen dropper PDP onto the display module DM, and thus it may be possible to evaluate durability of the first non-folding region NFA1 of the display module DM. This may be true for the second non-folding regions NFA2.

Referring to FIG. 10B, the pen dropper PDP may be disposed on the folding region FA of the display module DM. When viewed in plan, the pen dropper PDP may overlap the second recession RES2. The pen PEN may drop from the pen dropper PDP onto the display module DM, and thus it may be possible to evaluate durability of the folding region FA of the display module DM.

Figure 11:
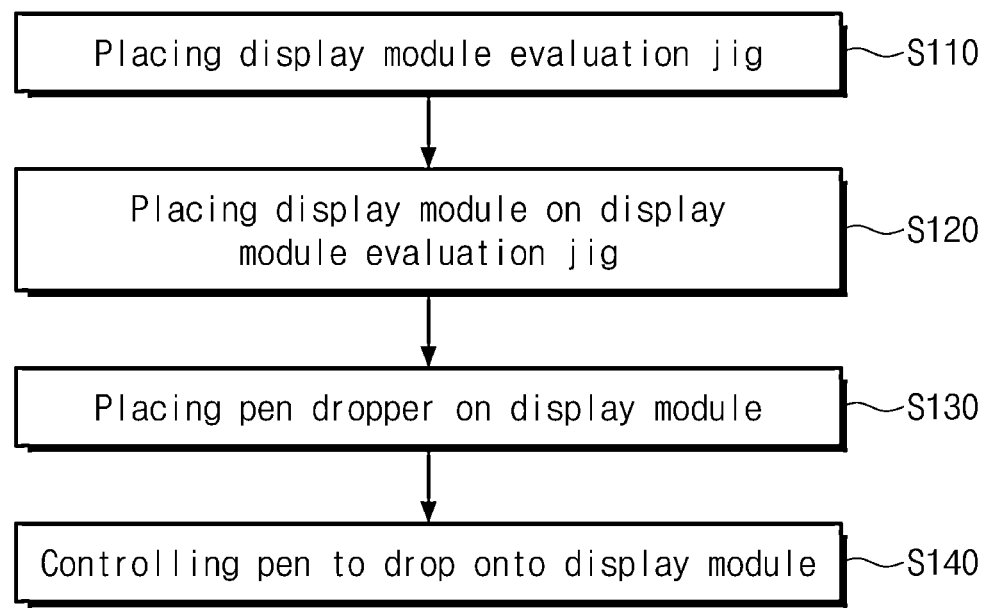
FIG. 11 illustrates a flow chart showing a display module evaluation method according to an embodiment of the present invention.

FIG. 11 illustrates a flow chart showing a display module evaluation method according to an embodiment of the present invention. FIGS. 12A to 12E illustrate perspective views showing a display module evaluation method according to an embodiment of the present invention.

Figure 12A:
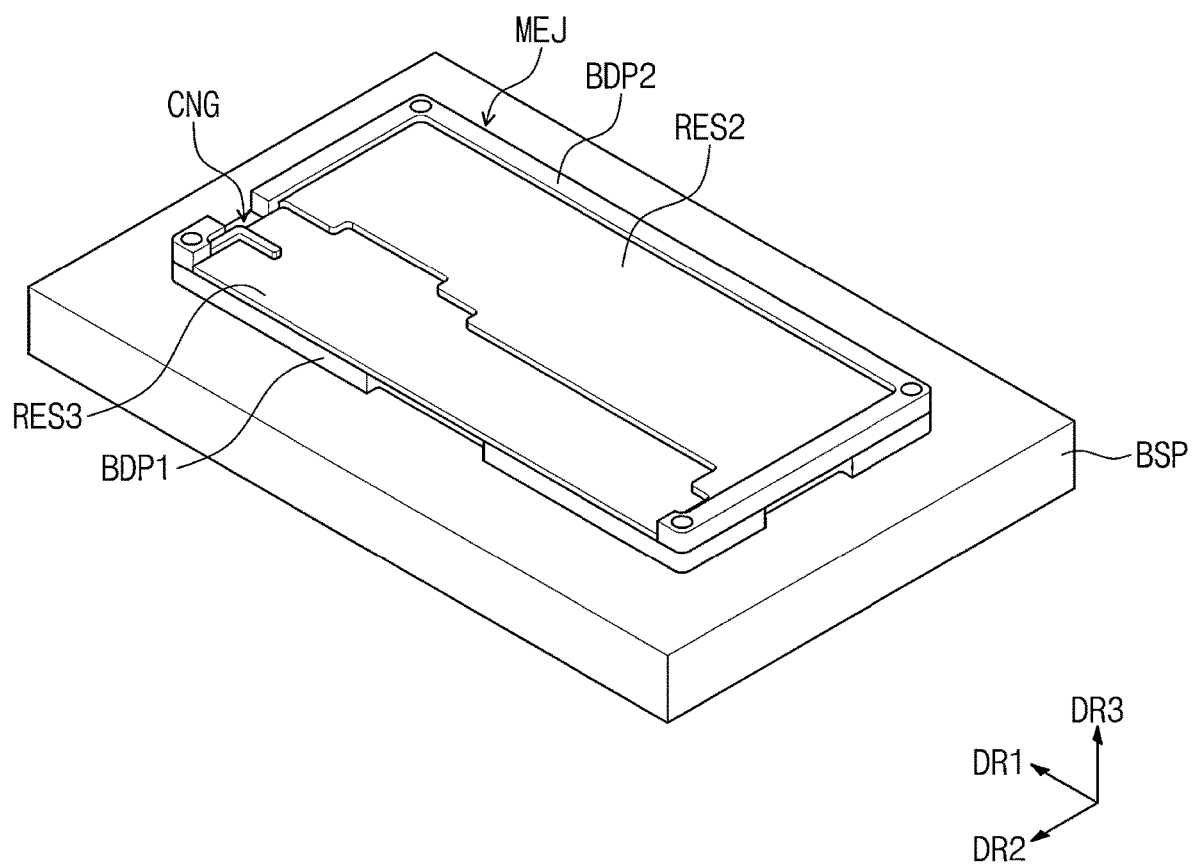
FIGS. 12A to 12E illustrate perspective views showing a display module evaluation method according to an embodiment of the present invention.

Referring to FIGS. 11 and 12A, in a step S110, the base layer BSP may be provided with the display module evaluation jig MEJ therein. The display module evaluation jig MEJ may include the first body BDP1, the second body BDP2 disposed on the first body BDP1, and a plurality of insertions INS disposed between the first body BDP1 and the second body BDP2.

The first body BDP1, the second body BDP2, and the insertions INS may be adjusted in accordance with evaluation targets in terms of material, thickness, interval between the first body BDP1 and the insertions INS, and interval between the second body BDP2 and the insertions INS so as to provide an evaluation environment of a display module similar to an actual environment of a display module set practically used by users.

The first body BDP1, the second body BDP2, and the insertions INS may be easily separated and assembled, and this may facilitate the adjustment in accordance with evaluation targets.

Figure 12B:
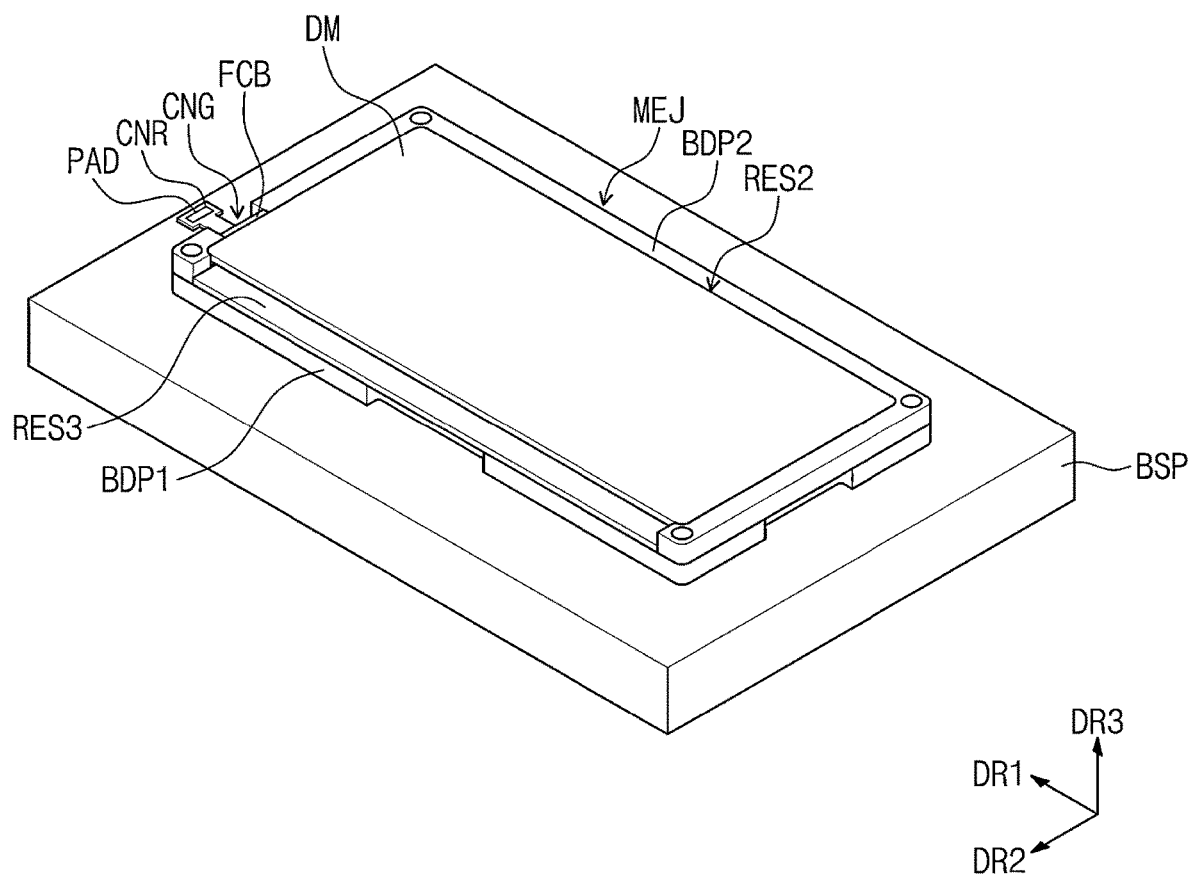

Referring to FIGS. 11 and 12B, in a step S120, the display module DM may be disposed on the second body BDP2 of the display module evaluation jig MEJ.

Figure 12C:
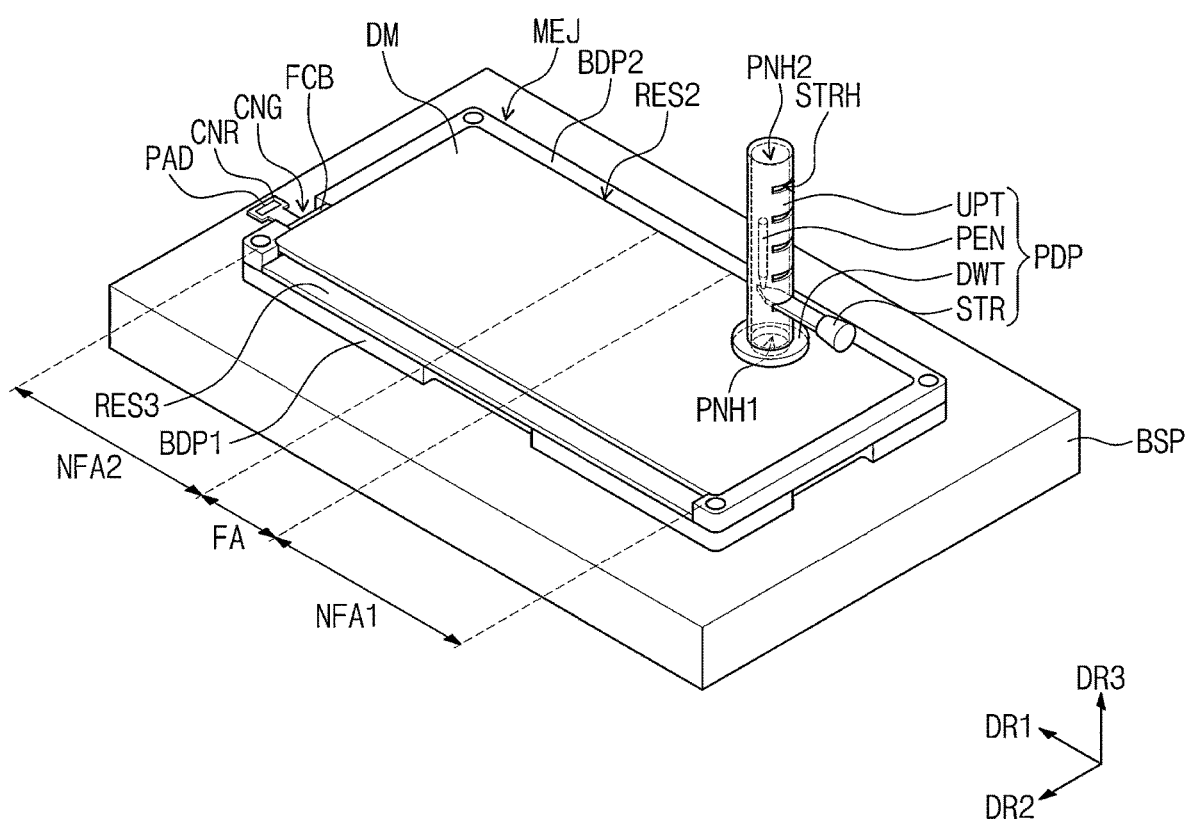

FIGS. 11 and 12C, in a step S130, the display module DM may be provided with the pen dropper PDP thereon, and the pen PEN is disposed in the pen dropper PDP. The pen dropper PDP may be sequentially disposed on the first non-folding region NFA1 and the second non-folding region NFA2 to evaluate durability of each of the first and second non-folding regions NFA1 and NFA2, and then may be disposed on the folding region FA to evaluate durability of the folding region FA. However, no limitation is imposed on the sequence for evaluating durability of the folding region FA, the first non-folding region NFA1, and the second non-folding region NFA2 according to the invention.

The stopper STR may be inserted into a lowermost one in the third direction DR3 of the stopper holes STRH defined on the pen dropper PDP. The pen PEN may be inserted into the pen dropper PDP and may be disposed on the stopper STR. For example, the pen PEN may be located at a lowermost height from the display module DM.

Figure 12D:
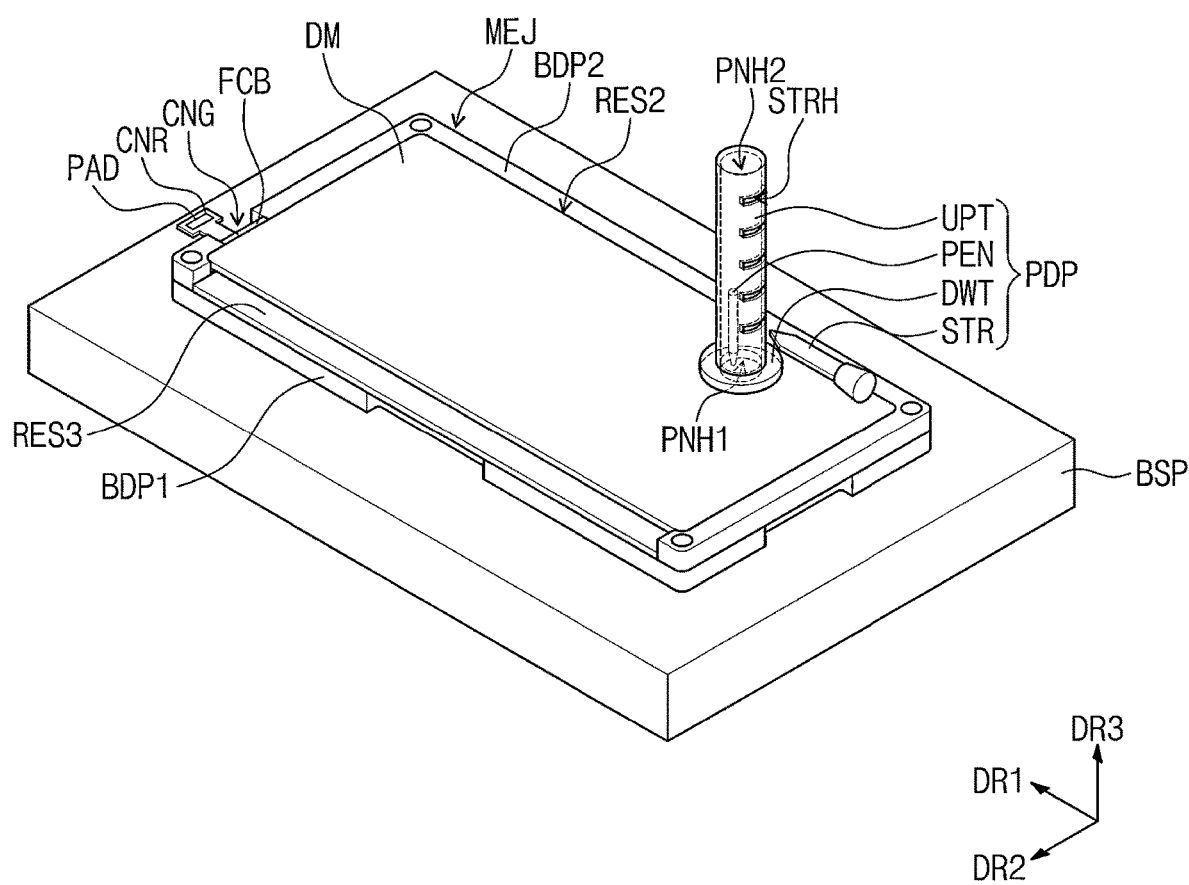
Figure 12E:
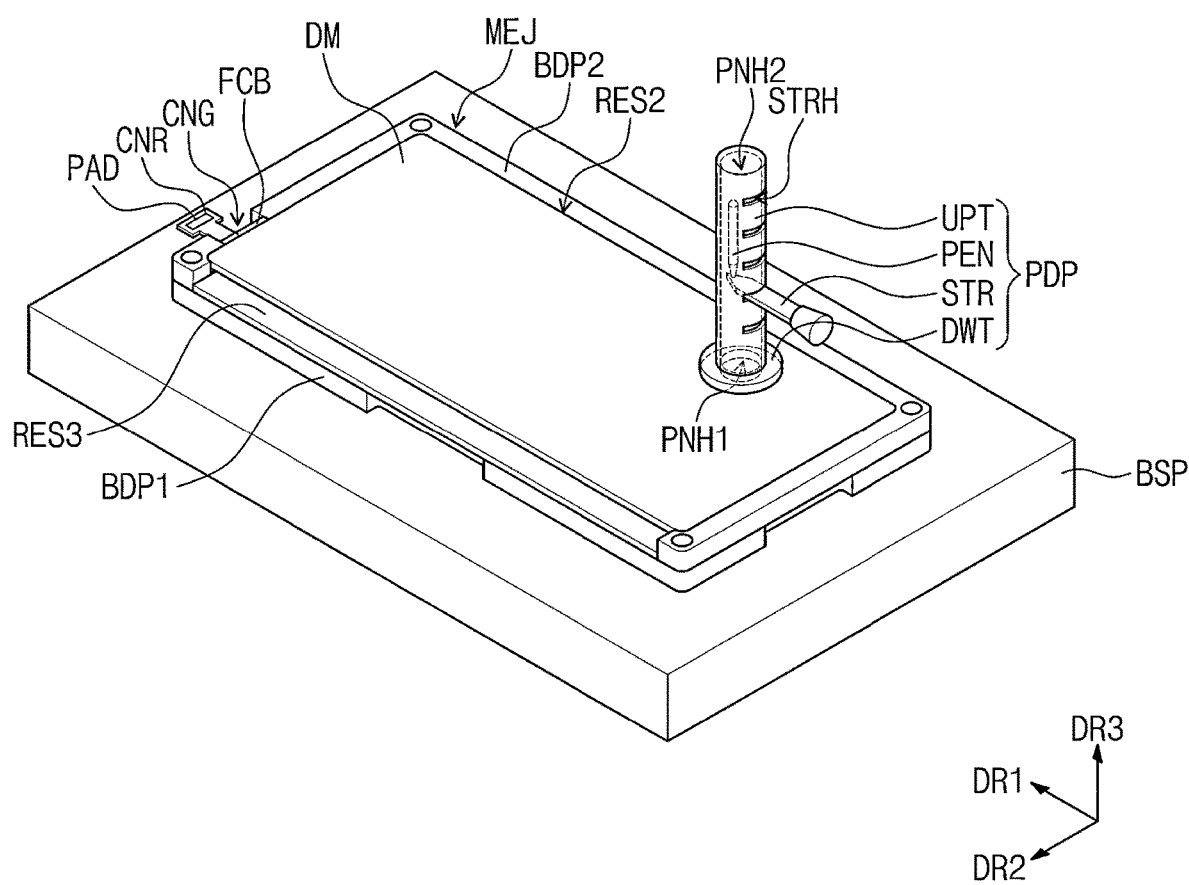

Referring to FIGS. 11, 12D, and 12E, in a step S140, the pen dropper PDP may control the pen PEN to drop onto the display module DM so as to provide the display module DM with impact.

The stopper STR may be separated from the pen dropper PDP. When the stopper STR is separated from the pen dropper PDP, the pen PEN disposed on the stopper STR may drop onto the display module DM.

It may be evaluated whether bright spot or crack is generated on the display module DM to which the pen PEN drops. When neither the bright spot nor the crack is generated on the display module DM, the height of the pen PEN may be changed to increase an amount of impact applied to the display module DM.

The height of the pen PEN from the display module DM may be adjusted by changing a height of the stopper hole STRH into which the stopper STR is inserted.

In accordance with impact applied to the display module DM, it may be possible to ascertain (i.e., determine) durability of the display module DM by identifying the height of the pen PEN that damages the display module DM. For example, it may be possible to evaluate the height of the pen PEN that generates bright spot or crack on the display module DM. The durability of the display module DM may be evaluated by identifying the height of the stopper hole STRH into which is inserted the stopper STR that determines the height of the pen PEN.

According to an embodiment of the present invention, a first body, a second body, and insertions of a display module evaluation jig may be changed in terms of material, thickness, interval between the first body and the insertions, and interval between the second body and the insertions, and therefore it may be possible to provide an evaluation environment similar to various actual environments of a display module set practically used by users.

Although the embodiments have been described with reference to a number of illustrative examples thereof, it will be understood by those of ordinary skill in the art that various changes in form and details may be made without departing from the spirit and scope of the present invention as set forth in the following claims. Thus, the technical scope of the present invention is not limited by the embodiments and examples described above, but by the following claims.

What is claimed is:

1. A display module evaluation jig, comprising:
   a first body defining a plurality of first recessions on a top surface of the first body;
   a second body disposed on and combined with the first body; and
   a plurality of insertions on the first recessions and between the first body and the second body,
   wherein inner lateral surfaces of the first body are directed toward and spaced apart from lateral surfaces of the insertions, and the inner lateral surfaces define the first recessions.

2. The display module evaluation jig of claim 1, wherein the insertions are spaced apart from a bottom surface of the second body, and the bottom surface of the second body faces the top surface of the first body.

3. The display module evaluation jig of claim 2, wherein the first recessions have a depth greater than a thickness of the insertions, the depth and the thickness are measured in a direction perpendicular to the top surface of the first body.

4. The display module evaluation jig of claim 1, wherein the first body defines a plurality of bending grooves that are recessed inwardly from lateral surfaces of the first body.

5. The display module evaluation jig of claim 4, wherein a display module is on the second body,
wherein the display module is folded about a folding axis that extends in one direction, and
wherein the folding axis overlaps a portion of the bending grooves in a plan view.

6. The display module evaluation jig of claim 5, wherein the second body defines a connecting groove that is recessed inwardly from one lateral surface of the second body.

7. The display module evaluation jig of claim 6, wherein a connector in the connecting groove is connected to the display module.

8. The display module evaluation jig of claim 5, wherein the display module is on a second recession that is defined on a first part of a top surface of the second body,
a flexible circuit board connected to the display module is on a third recession that is defined on a second part of the top surface of the second body, and
the third recession is lower than the second recession.

9. The display module evaluation jig of claim 8, wherein the first recessions do not overlap the third recession in the plan view.

10. The display module evaluation jig of claim 5, further comprising:
a pen which is disposed on the display module; and
a pen dropper which is disposed on the display module and in which the pen is disposed,
wherein the pen dropper adjusts a height of the pen and controls the pen to drop.

11. The display module evaluation jig of claim 10, wherein the pen dropper includes:
a lower tube defining a first pen hole on a central portion of the lower tube;
an upper tube on the lower tube and defining a plurality of stopper holes that are spaced apart from each other at a regular interval on one lateral surface of the upper tube, wherein the upper tube defines a second pen hole connected to the first pen hole; and
a stopper in one of the stopper holes of the upper tube.

12. A display module evaluation method, comprising:
placing on a base plate a display module evaluation jig that includes a first body, a second body on the first body, and a plurality of insertions between the first body and the second body;
placing a display module on the second body;
placing on the display module a pen dropper in which a pen is disposed; and
controlling the pen dropper to drop the pen from the pen dropper to the display module to provide the display module with impact.

13. The display module evaluation method of claim 12, wherein controlling the pen dropper includes controlling the pen to drop onto the display module by using the pen dropper to change a height of the pen.

14. The display module evaluation method of claim 13, further comprising: determining durability of the display module by identifying the height of the pen inducing damage to the display module in accordance with the impact.

15. The display module evaluation method of claim 13, wherein
the display module is on a second recession defined on a first part of a top surface of the second body,
a flexible circuit board connected to the display module is on a third recession that is defined on a second part of the top surface of the second body, and
the third recession is lower than the second recession.

16. The display module evaluation method of claim 15, wherein placing the pen dropper includes disposing the pen dropper on the display module that overlaps the second recession in a plan view.

17. The display module evaluation method of claim 16, wherein the pen dropper includes a lower tube, an upper tube on the lower tube, and a stopper,
wherein a first pen hole is defined in a central portion of the lower tube,
wherein a second pen hole is defined in a central portion of the upper tube, and the second pen hole is connected to the first pen hole,
wherein a plurality of stopper holes is defined on one lateral surface of the upper tube, and the stopper holes are spaced apart from each other at a regular interval and located at various heights, and
wherein the stopper is disposed in one of the stopper holes.

18. The display module evaluation method of claim 17, wherein controlling the pen to drop includes selectively disposing the stopper in the stopper holes to adjust the height of the pen and to control the pen to drop.

19. The display module evaluation method of claim 12, wherein a plurality of first recessions are defined on a top surface of the first body, and the first recessions receive the insertions.

20. The display module evaluation method of claim 19, wherein inner lateral surfaces of the first body are directed toward and spaced apart from lateral surfaces of the insertions, and the inner lateral surfaces define the first recessions.

* * * * *